US012316633B2

(12) United States Patent
Lee

(10) Patent No.: US 12,316,633 B2
(45) Date of Patent: May 27, 2025

(54) METHODS AND SYSTEMS FOR ACCESS CONTROL IN A COMPUTING SYSTEM

(71) Applicant: Shopify Inc., Ottawa (CA)

(72) Inventor: John Jong-Suk Lee, Waterloo (CA)

(73) Assignee: Shopify Inc., Ottawa (CA)

( * ) Notice: Subject to any disclaimer, the term of this patent is extended or adjusted under 35 U.S.C. 154(b) by 376 days.

(21) Appl. No.: 17/867,975

(22) Filed: Jul. 19, 2022

(65) Prior Publication Data

US 2023/0353570 A1    Nov. 2, 2023

Related U.S. Application Data

(60) Provisional application No. 63/336,816, filed on Apr. 29, 2022, provisional application No. 63/336,787, filed on Apr. 29, 2022, provisional application No. 63/336,798, filed on Apr. 29, 2022.

(51) Int. Cl.
*H04L 9/40* (2022.01)
(52) U.S. Cl.
CPC .................. *H04L 63/10* (2013.01)
(58) Field of Classification Search
CPC ...................................................... H04L 63/10
See application file for complete search history.

(56) References Cited

U.S. PATENT DOCUMENTS

| 6,401,118 | B1 | 6/2002 | Thomas |
| 10,505,726 | B1 | 12/2019 | Andon et al. |
| 10,929,842 | B1 | 2/2021 | Arvanaghi et al. |
| 11,062,284 | B1 | 7/2021 | Cunningham et al. |
| 11,075,891 | B1 | 7/2021 | Long |
| 11,276,014 | B2 | 3/2022 | Augustine et al. |
| 11,295,363 | B1 | 4/2022 | Kao et al. |
| 11,443,838 | B1 * | 9/2022 | Cordonnier ............ G16H 50/20 |
| 11,455,694 | B2 | 9/2022 | Dinunzio et al. |

(Continued)

FOREIGN PATENT DOCUMENTS

| CN | 110111102 | 8/2019 |
| CN | 110490752 | 11/2019 |

(Continued)

OTHER PUBLICATIONS

US Office Action, U.S. Appl. No. 17/475,240 dated May 9, 2024.

(Continued)

*Primary Examiner* — Beemnet W Dada
(74) *Attorney, Agent, or Firm* — Rowand LLP

(57) ABSTRACT

Methods and systems for access control in an online environment, such as an e-commerce platform. The system receives a designation of a non-fungible token (NFT) collection in connection with a merchant account, each NFT having a respective combination of attributes. An association is detected between a product record and a combination of two or more of the attributes and the system automatically generates an access rule with regard to the product record that is conditional on ownership of an NFT in the collection that has the combination of the two or more attributes. When a request for access is received, the access rule is applied to provide a user device with access to the one or more product records based on verification of the ownership by the user device of an NFT that meets the condition.

20 Claims, 15 Drawing Sheets

(56) References Cited

U.S. PATENT DOCUMENTS

| | | |
|---|---|---|
| 11,657,428 B1 | 5/2023 | Ritchie |
| 2005/0208940 A1 | 9/2005 | Takese |
| 2007/0174079 A1 | 7/2007 | Kraus |
| 2010/0131386 A1 | 5/2010 | Shiely et al. |
| 2010/0235218 A1 | 9/2010 | Erhart et al. |
| 2013/0246146 A1 | 9/2013 | Fischer et al. |
| 2014/0129422 A1 | 5/2014 | Zhou |
| 2014/0351953 A1 | 11/2014 | Bhatia |
| 2014/0358629 A1 | 12/2014 | Shivaswamy et al. |
| 2015/0186980 A1 | 7/2015 | Wood |
| 2015/0249872 A1 | 9/2015 | Lee et al. |
| 2015/0324840 A1 | 11/2015 | Ramnath Krishnan |
| 2015/0363783 A1 | 12/2015 | Ronca |
| 2015/0363858 A1 | 12/2015 | Kleinhandler et al. |
| 2016/0171534 A1 | 6/2016 | Linden |
| 2016/0210674 A1 | 7/2016 | Allen et al. |
| 2016/0292672 A1 | 10/2016 | Fay et al. |
| 2017/0011460 A1 | 1/2017 | Molinari et al. |
| 2017/0116693 A1 | 4/2017 | Rae |
| 2017/0140408 A1 | 5/2017 | Wuehler |
| 2017/0155515 A1 | 6/2017 | Androulaki et al. |
| 2017/0221029 A1 | 8/2017 | Lund et al. |
| 2017/0330174 A1 | 11/2017 | Demarinis |
| 2017/0357966 A1 | 12/2017 | Chandrasekhar et al. |
| 2018/0108036 A1 | 4/2018 | Laufenberg et al. |
| 2018/0150869 A1 | 5/2018 | Finnegan |
| 2019/0066065 A1 | 2/2019 | Wright et al. |
| 2019/0073666 A1 | 3/2019 | Ortiz et al. |
| 2019/0130439 A1 | 5/2019 | Handrigan et al. |
| 2019/0139136 A1 | 5/2019 | Molinari et al. |
| 2019/0164157 A1 | 5/2019 | Balaraman |
| 2019/0220836 A1 | 7/2019 | Caldwell |
| 2019/0220917 A1 | 7/2019 | Busjaeger |
| 2019/0266616 A1 | 8/2019 | Strutton |
| 2019/0294817 A1 | 9/2019 | Hennebert |
| 2019/0303892 A1 | 10/2019 | Yantis et al. |
| 2019/0311341 A1 | 10/2019 | Rice |
| 2020/0005284 A1 | 1/2020 | Vijayan |
| 2020/0053081 A1 | 2/2020 | Park et al. |
| 2020/0112446 A1 | 4/2020 | Yoshihama |
| 2020/0134660 A1 | 4/2020 | Kadaster |
| 2020/0153607 A1 | 5/2020 | Shi et al. |
| 2020/0242105 A1 | 7/2020 | Rich et al. |
| 2020/0244752 A1 | 7/2020 | Trainor |
| 2020/0364703 A1 | 11/2020 | Joveski |
| 2020/0379981 A1 | 12/2020 | Yoon |
| 2021/0014042 A1 | 1/2021 | Sivathanu |
| 2021/0124616 A1 | 4/2021 | Verma |
| 2021/0241351 A1 | 8/2021 | Francis et al. |
| 2021/0243201 A1 | 8/2021 | Tandel |
| 2021/0256070 A1 | 8/2021 | Tran |
| 2021/0366586 A1 | 11/2021 | Ryan et al. |
| 2021/0383334 A1 | 12/2021 | Krasnyansky |
| 2021/0390531 A1 | 12/2021 | Voorhees |
| 2022/0035936 A1 | 2/2022 | Lin |
| 2022/0058633 A1 | 2/2022 | Yantis |
| 2022/0076279 A1 | 3/2022 | Renaud |
| 2022/0101316 A1 | 3/2022 | Cramer |
| 2022/0198418 A1 | 6/2022 | Kang |
| 2022/0210061 A1 | 6/2022 | Simu |
| 2022/0222364 A1* | 7/2022 | Roberts .................. G06F 21/64 |
| 2022/0292490 A1 | 9/2022 | Collen |
| 2022/0318233 A1 | 10/2022 | Martinez |
| 2022/0351187 A1 | 11/2022 | Kim |
| 2022/0398340 A1 | 12/2022 | Jakobsson |
| 2023/0043095 A1 | 2/2023 | Miliam |
| 2023/0062776 A1* | 3/2023 | Vosseller ............. G06Q 30/018 |
| 2023/0073545 A1 | 3/2023 | Kurian |
| 2023/0079195 A1 | 3/2023 | Matheson |
| 2023/0086191 A1 | 3/2023 | Jakobsson |
| 2023/0195855 A1 | 6/2023 | Mavromatis |
| 2023/0206218 A1 | 6/2023 | Defour |
| 2023/0306412 A1 | 9/2023 | Gaur |
| 2023/0360029 A1 | 11/2023 | Pranger |
| 2024/0020682 A1 | 1/2024 | Castagna |
| 2024/0037593 A1 | 2/2024 | Navon |
| 2024/0039369 A1 | 2/2024 | Shenoy et al. |
| 2024/0039722 A1 | 2/2024 | Deluca |
| 2024/0046074 A1 | 2/2024 | Lewis |

FOREIGN PATENT DOCUMENTS

| | | |
|---|---|---|
| CN | 108364173 | 1/2021 |
| CN | 109272380 | 1/2023 |
| EP | 3748914 | 12/2020 |
| EP | 4148643 A1 | 3/2023 |
| RU | 2018132715 A | 3/2020 |
| TW | 1674543 | 10/2019 |
| WO | 2013111142 A2 | 8/2013 |
| WO | 2016202952 | 12/2016 |
| WO | 2017197110 | 11/2017 |
| WO | 2020092900 | 5/2020 |
| WO | 2022204404 | 9/2022 |

OTHER PUBLICATIONS

Xingxiong Zhu et al; "Application of Blockchain in Document Certification, Asset Trading and Payment Reconciliation"; Journal of Physics: Conference Series, vol. 1187, Issue 5.
US Office Action dated Jul. 11, 2023, U.S. Appl. No. 17/475,240.
US Office Action, U.S. Appl. No. 17/473,284, filed Sep. 21, 2023.
US Office Action dated Feb. 23, 2024; U.S. Appl. No. 17/893,370.
European Search Report dated Oct. 10, 2022, EP Application No. 22169579.4.
Sep. 10, 2021, XP055966676, Retrieved from the Internet: URL: http://en.wikipedia.org/w/index.php?title=Non-fungible_token&oldid=3593775#Collectibles.
US Office Action dated Oct. 17, 2022, U.S. Appl. No. 17/344,251.
USPTO; Office Action relating to U.S. Appl. No. 17/955,631 dated Apr. 15, 2024.
Antonopoulos, Andreas; "Mastering Bitcoin Unlocking Digital Cryto-Currencies"; O'Reilly Media, Inc., all pages (Year: 2014).
US Office Action dated Apr. 21, 2021, U.S. Appl. No. 16/782,561.
US Office Action dated Oct. 7, 2021, U.S. Appl. No. 16/782,561.
US Office Action dated Jan. 20, 2022, U.S. Appl. No. 16/782,561.
US Office Action dated Jul. 26, 2022, U.S. Appl. No. 16/782,561.
Office Action dated Nov. 25, 2022, U.S. Appl. No. 16/782,561.
Office Action dated Apr. 14, 2023, U.S. Appl. No. 16/782,561.
Dialog, Online Searcher, To Be Or Not to Be Competitive Intelligence Tools, Aug. 2019.
US Office Action dated Jul. 27, 2021, U.S. Appl. No. 16/782,556.
US Office Action dated Mar. 6, 2023, U.S. Appl. No. 17/479,650.
US Office Action, U.S. Appl. No. 17/903,109, filed Jun. 3, 2024.
PCT Supplementary International Search Report relating to Application No. PCT/CA2023/050452 dated Jul. 12, 2024.
G. Gan, E. Chen, Z. Zhou and Y. Zhu, "Token-Based Access Control," in IEEE Access, vol. 8, pp. 54189-54199, 2020, doi: 10.1109 /ACCESS.2020.2979746. (Year: 2020).
Rafati et al., "DeTi: A Decentralized Ticketing Management Platform," J Netw Syst Manage, 2022, 30(4):62. doi: 10.1007/s10922-022-09675-3. Epub Jul. 26, 2022. PMCID: PMC9315850. (Year: 2022).
Regner et al., "NFTs in Practice—Non-Fungible Tokens as Core Component of a Blockchain-based Event Ticketing Application." retrieved from https://www. researchgate.neUpublication/336057493_NFTs_in_Practice_-_Non-Fungible_Tokens_as_Core_Component_of_a_Blockchain-based_Event_Ticketing_Application (Year: 2019).
Feulner et al., "Exploring the use of self-sovereign identity for event ticketing systems," Electron Mark, 2022, 32(3):1759-1777. doi: 10.1007/s12525-022-00573-9. Epub Jul. 30, 2022. PMID: 35965736; PMCID: PMC9361939. (Year: 2022).
US Office Action dated Sep. 20, 2024, U.S. Appl. No. 17/955,631.
US Office Action dated Sep. 25, 2024, U.S. Appl. No. 17/866,746.

* cited by examiner

FIG. 9

//‌
METHODS AND SYSTEMS FOR ACCESS CONTROL IN A COMPUTING SYSTEM

CROSS-REFERENCE TO RELATED APPLICATIONS

The present application claims priority to U.S. Provisional Application Nos. 63/336,787, 63/336,798, and 63/336,816, each of which was filed on Apr. 29, 2022, and each of which is hereby incorporated by reference.

TECHNICAL FIELD

The present disclosure relates to computer-implemented access control systems and methods and, in particular, systems and methods that control whether a computing device is permitted to access to an online resource or web page.

BACKGROUND

In many online access control systems, a rule set may determine the conditions under which access is granted or denied to a requesting device. For example, a rule may require that the requesting device provide authorized credentials prior to providing access to a resource. As another example, a rule may provide that a requesting device with a particular characteristic is blocked from accessing a resource, e.g. a certain device type, geographic location, operating system, or other features or characteristics of the requesting device.

In order to implement a rule set to govern access control, an administrator must determine the conditions for granting or denying access in advance and then encode those conditions in suitable access control rules.

BRIEF DESCRIPTION OF THE DRAWINGS

Embodiments will be described, by way of example only, with reference to the accompanying figures wherein:

FIG. 9 is an example of a home page of an administrator, in accordance with an example embodiment;

Like reference numerals are used in the drawings to denote like elements and features.

DETAILED DESCRIPTION OF EMBODIMENTS

Figure 1:
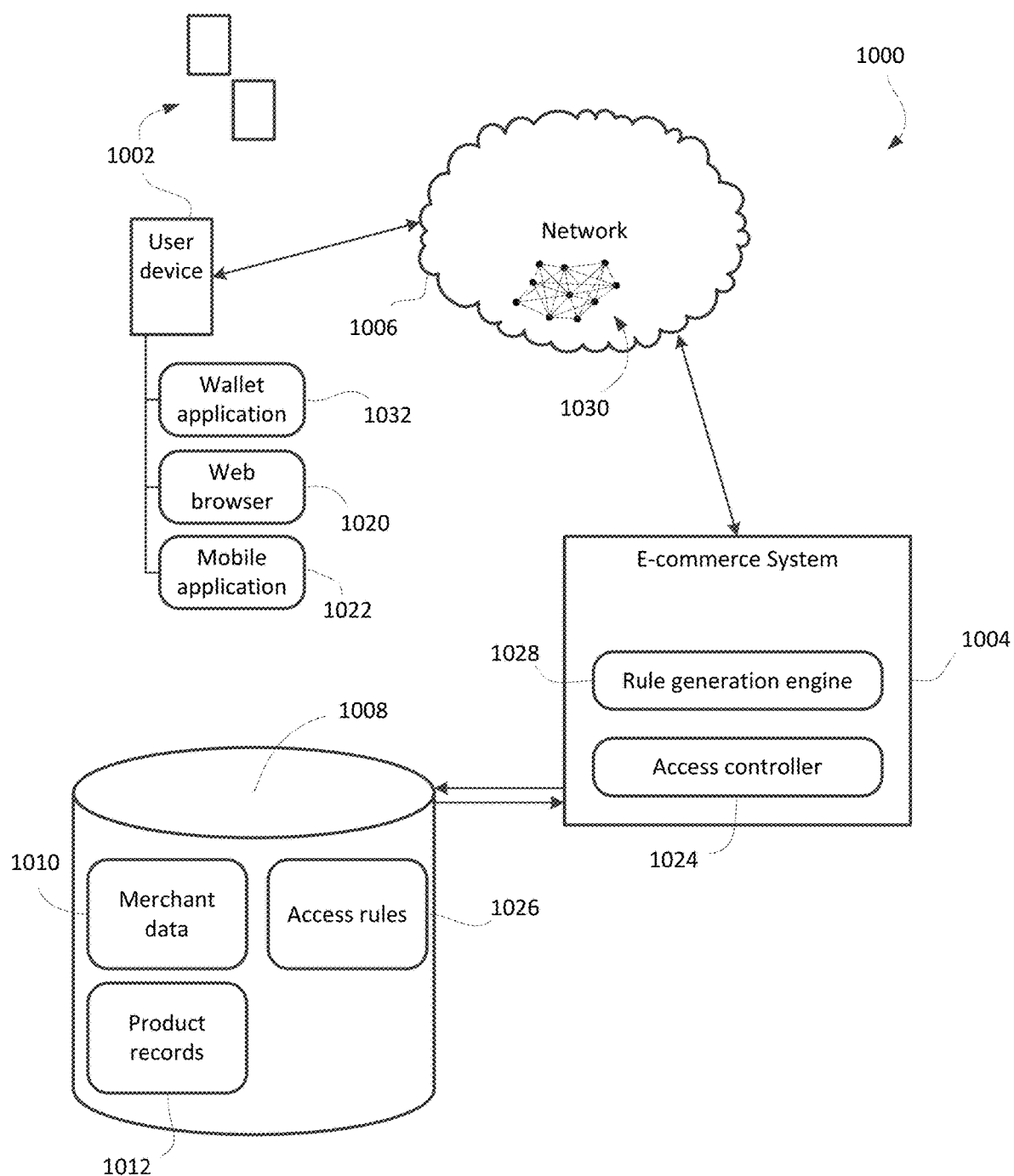
FIG. 1 is a simplified example system.

In one aspect, the present application discloses a computer-implemented method that may include receiving, at a server, a designation of a non-fungible token collection in connection with a merchant account, each non-fungible token in the non-fungible token collection having a respective combination of non-fungible token attributes. The method may further include detecting an association between one or more product records and a combination of two or more of the non-fungible token attributes; automatically generating an access rule with regard to the one or more product records, wherein the access rule is conditional on ownership of one of the non-fungible tokens of the non-fungible token collection that has the combination of the two or more of the non-fungible token attributes; and applying the access rule to provide a user device with access to the one or more product records based on verification of the ownership of the one of the non-fungible tokens by the user device.

In some implementations, detecting the association includes detecting a newly-minted token in the non-fungible token collection, the newly-minted token having a set of attributes that includes the combination of the two or more of the non-fungible token attributes; and detecting a correlation between the combination of the two or more of the non-fungible token attributes and the one or more product records. In some cases, the one or more product records include product attributes, and wherein the correlation is based on matching between the product attributes and the combination of two or more of the non-fungible token attributes. In some cases, the correlation has an associated correlation metric, and the automatically generating is based on determining that the correlation metric exceeds a minimum confidence threshold.

In some implementations, applying the access rule further includes presenting the access rule to a merchant device and receiving a confirmation message approving the access rule.

In some implementations, the method may further include receiving, from the user device, at least an NFT identifier; querying a blockchain regarding the NFT identifier; receiving, from the blockchain, non-fungible token data associated with the NFT identifier including ownership data that includes a wallet identifier; and verifying that the wallet identifier in the ownership data matches a user device wallet identifier. In some cases, verifying includes validating a cryptographic signature from the user device using the wallet identifier. In some cases, the non-fungible token data further includes the combination of two or more of the non-fungible token attributes.

In some implementations, applying the access rule includes verifying ownership of the one of the non-fungible tokens by receiving and validating a cryptographic signature from the user device based on a wallet identifier.

In some implementations, applying the access rule includes verifying ownership of a combination of non-fungible tokens and fungible tokens owned by a user as identified by a wallet identifier. The fungible tokens may include a currency or coin balance, and access rules may be based on the current balance being above a minimum amount of currency or coins.

In some implementations, the one or more product records relate to a discount on a product item.

In some implementations, the one or more product records relate to a limited edition product item.

In some implementations, applying the access rule to provide a user device with access to the one or more product records includes providing the user device with a restricted product record for a requested product item when ownership of the one of the non-fungible tokens by the user device is verified and providing the user device with an unrestricted product record for the requested product item when ownership of the one of the non-fungible tokens by the user device cannot be verified.

In at least a second aspect, the present application discloses a computer-implemented method that may include receiving, at an e-commerce system, a request for access from a user device; receiving, by the e-commerce system from a blockchain network, data regarding at least one non-fungible token associated with the user device; identifying an access rule associated with a merchant account, wherein the access rule includes a condition for access to one or more product records based on ownership of one or more non-fungible tokens; and applying the access rule to determine whether the at least one non-fungible token meets the condition and to provide the user device with access to the one or more product records.

In some implementations, the one or more non-fungible tokens and the at least one non-fungible token are third-party token unconnected to the e-commerce system.

In some implementations, the condition requires ownership of at least one of the one or more non-fungible tokens for more than a minimum duration.

In some implementations, the condition specifies a third-party token collection and the at least one non-fungible token is part of the third-party token collection.

In some implementations, the condition specifies a combination of token attributes, and wherein applying the access rule includes determining that the at least one non-fungible token includes the combination of token attributes.

In some implementations, the at least one non-fungible token is a record of a previous purchase of a good or service from a third party.

In some implementations, the at least one non-fungible token is a record of participation or membership of an associated user of the user device in a third-party event.

In some implementations, receiving data regarding the at least one non-fungible token associated with the user device may include receiving, from the user device, an NFT identifier and a wallet identifier; querying the blockchain network using the NFT identifier or the wallet identifier; and receiving the data, wherein the data includes ownership data regarding the at least one non-fungible token.

In some implementations, the condition for access to the one or more product records specifies ownership of two or more non-fungible tokens having specified attributes, and the data received indicates ownership by the user device of at least two non-fungible tokens having the specified attributes.

In some implementations, applying the access rule includes determining that the at least one non-fungible token has attributes matching at least one of the one or more non-fungible tokens.

In some implementations, the one or more product records include records relating to a discounted product, a limited edition product, or an early-access product.

In some implementations, receiving data includes receiving data regarding one or more fungible tokens associated with the user device, the condition further includes a fungible token condition, and applying further includes determining whether the one or more fungible tokens associated with the user device met the fungible token condition.

In at least a third aspect, the present application discloses a computer-implemented method. The method may include receiving a request for interface content from a user device; identifying at least one non-fungible token associated with the user device; customizing the interface content for the user device based on the at least one non-fungible token to generate customized interface content; and transmitting the customized interface content to the user device for output on a user interface.

In some implementations, customizing the interface content for the user device based on the at least one non-fungible token includes customizing the interface content based on one or more attributes of the at least one non-fungible token.

In some implementations, identifying includes identifying at least two non-fungible tokens associated with the user device, and customizing includes customizing the interface content for the user device based on at least one attribute from each of the at least two non-fungible tokens.

In some implementations, customizing includes determining one or more colours associated with the at least one non-fungible token and customizing includes setting a colour parameter in the interface content based on the one or more colours. In some cases, determining one or more colours includes determining the one or more colours based on an analysis of an image associated with the at least one non-fungible token. The analysis may include a dominant colour analysis.

In some implementations, the interface includes a set of prescribed colours including a default colour at one or more other colours, and setting the colour parameter includes selecting the colour parameter from among the one or more other colours based on the one or more colours associated with the at least one non-fungible token.

In some cases, wherein setting the colour parameter includes changing the colour of a graphical element in the interface content. The graphical element may be one of a background colour, menu colour, scroll bar colour, header colour, or button colour.

In some implementations, the at least one non-fungible token is associated with an image and customizing includes performing object detection within the image to identify an object and altering at least one graphical element in the interface content based on the object.

In some implementations, customizing includes determining a level attribute specified by the at least one non-fungible token and includes modifying one or more graphical elements in the interface content based on the level attribute.

In some implementations, the non-fungible token is associated with a font, and customizing includes rendering at least some text from the interface content using the font. In some cases, customizing includes downloading a font package corresponding to the font.

In some implementations, customizing the interface content for the user device based on the at least one non-fungible token includes modifying at least one parameter or setting in the interface content without adding text or graphics from the non-fungible token to the interface content.

In some implementations, the at least one non-fungible token includes attributes and graphics and output of the customized interface content does not display the attributes and graphics from the at least one non-fungible token.

In some implementations, identifying at least one non-fungible token associated with the user device includes receiving a token identifier or a wallet identifier from the user device and querying a blockchain network to confirm ownership of the at least one non-fungible token by the user device.

In some implementations, customizing includes modifying at least one element of a markup language document to create a customized markup language document.

In some implementations, the interface content is a web page or a mobile application page.

In yet another aspect, the present application describes a computer-implemented method that may include identifying at least one non-fungible token associated with a user device, querying a blockchain network to validate the association between the at least one non-fungible token and the user device, receiving a request for interface content from the user device, determining that the interface content is customizable, determining a customization operation based on token metadata for the at least one non-fungible token, wherein the customization operation changes at least one existing graphical element specified in the interface content without embedding content contained in the at least one non-fungible token, applying the customization operation to the interface content to generate customized interface content, and transmitting the customized interface content to the user device.

In another aspect, the present application discloses a computing system including one or more processing units, one or more data storage units, and memory storing processor-executable instructions that, when executed by the one or more processing units, are to cause the processing units to carry out the operations of one or more of the methods described herein.

In yet another aspect, a non-transitory, computer readable storage medium is disclosed. The medium may store processor-executable instructions that, when executed, cause one or more processors to carry out the operations of one or more of the methods or processes described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the terms "e-commerce platform" or "e-commerce system" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and associated payment requests, via an e-commerce platform, and the e-commerce platform may be equipped with transaction/payment processing components or delegate such processing activities to one or more third-party services. An e-commerce platform may be extendible/extensible by connecting one or more additional sales channels representing platforms where products can be sold. The e-commerce platform may serve one merchant in some implementations. The e-commerce platform may be a multi-merchant platform in other cases, where each merchant is able to use some or all of the available services to configure an online storefront and provide commerce services to customers of the online storefront. A multi-merchant e-commerce platform may operate across a range of geographic regions, and may operate in multiple countries, currencies, and time zones.

Some of the examples below refer to a "product record". A product record in this context may refer to data regarding a specific product item, or a specific version of that product item. The data may include details of the product item, technical specifications, narrative description, image(s) of the product item, customer reviews, pricing information, inventory information, shipping information, or any other product data of a similar nature. In some cases a product record may be a web page. In some cases, the product record may be an XML record. The product record may be embodied in any other suitable mark-up language or other coding language.

The growth of blockchain networks has led to the development of non-fungible tokens (NFT). Each NFT is a unique combination of characteristics/attributes and/or media and may have a unique token ID.

In many implementations, a smart contract may be created for the purpose of minting and/or tracking NFTs. The Ethereum blockchain network has an associated standard, ERC-721, providing a reference implementation of a smart contract for tracking and managing NFTs. Various other standards, such as ERC-1155 for fungible or non-fungible tokens and/or ERC-20 for fungible tokens, may apply. In some cases, the NFTs generated by a smart contract may form a collection, in that the NFTs generated by that smart contract have some limited universe of possible attributes or characteristics. In some cases, the NFTs in a collection are computer-generated art in which various layers of digital art are made available for pseudo-randomized selection to generate each unique digital media. The layers may correspond to particular characteristics, such a various eyes, mouths, hats, accessories, etc., used to generate a unique digital image of a character. In some other cases, the NFTs in a collection may be images or videos that relate to a particular type of activity, sport, or other interest, such as images or videos of particular football players, video clips from baseball plays, photographs of a specific celebrity or group of celebrities, etc. Example NFT collections include, for example, the "Bored Ape" collection, the "NBA™ TopShot" collection, or the "Invisible Friends" collection.

A smart contract is executable computer code recorded on the blockchain that, when properly "called" in a subsequent blockchain transaction, executes so as to carry out its defined operations. In the case of an NFT smart contract, a minting operation may cause the smart contract to produce a new unique NFT that corresponds to a particular one unique NFT. That unique NFT may be digital art, an image, a video, or a combination thereof in some examples. Each NFT may have associated attributes or characteristics. Example attributes include the elements pseudo-randomly selected for generation of the digital image, such as specific eyes, mouth, accessories, etc., for an image of a character. Another set of example attributes may be the context or characteristics of a particular image or video, such as the identity of the person/player featured, the team or teams involved, the date, the score, the type of play, or other such features.

Once NFTs are minted, they may be made available through an online marketplace in some cases. Various wallets, i.e. network-connected computing devices with blockchain wallet software operating thereon, may initiate blockchain transactions to obtain and/or transfer NFTs. Ownership of an NFT by a wallet is recorded on-chain and is verifiable by third parties. In some cases, a wallet may own a plurality of NFTs. The ownership of those NFTs may be verifiable by third parties based on a query to the blockchain network, i.e. to a blockchain node, providing data from the wallet, such as a public key associated with the wallet. In some cases the query may identify the NFTs by way of unique identifiers, or by way of an identifier for the NFT collection to which they belong. The blockchain node may respond by providing verification that the public key provided is associated with the NFT as reflected in the data recorded on the blockchain. The NFT smart contract may provide functions for verifying NFT ownership data.

While many NFTs have been generated to represent ownership interest in some auto-generated digital media, in other cases NFTs may be used as a "proof-of-purchase" or a receipt or record of ownership or investment. In this context, NFTs may indicate a history of purchases or certain product items and, in some cases, record current ownership of those product items. An NFT may be as simple as a record of purchase (receipt) for various common items from a grocery store. In some cases, the NFT may be a record of ownership of a non-perishable real-world item, such as real estate, a financial instrument, an automobile, etc.

In yet other examples, NFTs may be used as a "ticket" for access or as a "proof-of-attendance". For instance, a concert ticket may be minted and recorded as an NFT, which when validated at a venue (e.g. using a QR code scanner or the like to obtain a wallet identifier and an NFT identifier and then validate ownership via a blockchain query) grants the holder of the user device access to the concert. As another example, an NFT may record the fact of attendance at an event, such as a training course or a social event. NFTs may signal membership in a club, attendance at a restaurant, participation or level or progress in an online game, or any other such events.

Automated Access Rule Generation

As noted above, access control systems may rely on pre-generated rule sets that specify conditions for granting or denying access to a resource. An administrator of such a system must usually determine the applicable condition or combination of conditions in advance and embody them in suitable access control rules. The system then, in response to a request for access from a requesting device, retrieves the access control rules and assesses whether the requesting device and/or its present context meets the condition or combination of conditions specified in one of the access control rules. Access to the resource is then granted or denied based on that assessment. In this manner, the system gates access to the resource based on the condition or combination of conditions.

In some cases, it is impractical or impossible to determine in advance all the combinations of conditions that should be encoded in an access control rule. In some contexts, it may be impractical or impossible for an administrator to determine in advance whether a combination of conditions will arise and, if so, what resource(s) are associated with that combination of conditions. In some contexts, identifying and detecting new combinations of conditions may necessarily require computerized searching and detection algorithms. The present application provides systems and methods for generating and applying access control rules that, in part, may address some of these technical challenges.

In some situations, NFT ownership may be used as a proxy for interest or investment in particular industries, sports, or areas of interest. Accordingly, in some cases, a wallet associated with one or more NFTs through ownership may be considered authenticated or validated. That is, ownership by a computing device of one or more particular NFTs may entitle that computing device to access or resources not otherwise available. Ownership of one or more particular NFTs may be gating condition for granting access to particular online resources.

One of the challenges of generating access control rules based on NFT ownership, is that the combination of characteristics of NFTs in some collections are unknown in advance. That is, NFTs in a collection may be regularly generated and minted that features combinations of NFT attributes that cannot practically be anticipated in advance. Accordingly, it is impractical to create a comprehensive set of access control rules that set conditions based on the combination of characteristics of NFTs in advance.

Advantageously, example systems and methods described below automate the detection of combinations of NFT attributes, detection of an association between a combination of NFT attributes and an online resource, the generation of an access control rule for the online resource that includes as a condition ownership of an NFT having that combination of NFT attributes.

In some examples, the online resource may be a webpage, server login, computer game, livestream, or other such online resource to which access may be controlled. In an illustrative example, the online resource may be an e-commerce product or service. That is, access to one or more products or services available via an e-commerce system or platform may be controlled based on ownership of one or more NFTs having certain characteristics or attributes. In some cases, the access is to a version of a webpage or other online resource associated with the product or service that includes a discount or incentive not otherwise available for that product or service. The online resource may be accessed by a computing device via a webpage or mobile app interface, wherein a remote server, e.g. an e-commerce platform, determines that access by the computing device is permitted based on verification that one or more NFTs meeting the access conditions are associated with the computing device. Determining that the NFTs are associated with the computing device may be based on obtaining blockchain data from a wallet application installed and operating on the computing device and validating that blockchain data via a blockchain network.

In the example case of an e-commerce platform, a merchant account may have an association with an NFT collection. In some cases, the merchant account may designate the NFT collection as associated with all of the merchant's available products or with a sub-set of the merchant's available products. In some cases, the sub-set may be a certain category of limited access products, such as limited edition, discounted, or early access versions of the products. The platform may then detect a specific combination of NFT attributes associated with the NFT collection that are associated with or correlated to at least one of the merchant products. It may then automatically generate an access control rule having as a condition for access ownership of an NFT from the collection having that specific combination of NFT attributes.

It will be appreciated that in some cases, only one NFT of a collection may have the specified combination of attributes. In some other cases, many NFTs of a collection may have the specified combination of attributes. The combination may be a single attribute in some examples. The combination of attributes may not include all types of attributes of the NFTs. For example, the combination of attributes in a digital art context may specify a particular style of hat and eye colour. Other attributes of the digital art, including mouth, accessories, etc., may not be part of the condition. In another example, in the context of a sports video clip NFT, like NBA™ TopShots, the condition may specify a particular player, e.g. LeBron James, and a particular type of play, e.g. dunk, but the teams involved, the date, and score may not be part of the condition.

The platform may detect an association between one or more product records within the merchant collection and the identified combination of NFT attributes. For example, with reference to the combination of Lebron James and "dunk", the platform may identify a correlation or association with a product record, such as a signed LeBron James jersey, special offer L.A. Lakers tickets, a limited edition Cleveland Cavaliers championship commemorative artwork, or other such items. Ownership of an NFT having the identified combination of NFT attributes may be associated with sufficient interest and investment to grant the computing device early or discounted or exclusive access to certain product records.

Notably, a merchant cannot necessarily determine in advance if an NFT will be generated and minted in the NFT collection having a specific combination of attributes, such as a character with particular hat and eye colour, or a particular video clip of a game that has not yet been played. Moreover, the merchant catalog of products may be extensive and may change frequently. Accordingly, the merchant cannot encode a full set of access control rules in advance and it may be impractical to manually encode new access control rules in real-time as product records change and as NFTs are minted.

Reference will now be made to FIG. 1, which diagrammatically illustrates a simplified example system 1000 in accordance with an aspect of the present application. In this example, the system 1000 includes a network-connected server, which in this example is an e-commerce system 1004, and a plurality of user devices 1002. The user devices 1002 and e-commerce system 1004 may communicate over a network 1006. The network 1006 may include interconnected wired and/or wireless networks, including the Internet. The user devices 1002 may include a range of computing devices, such as laptops, desktops, tablets, smartphones, and the like.

The e-commerce system 1004 may be implemented using one or more servers. The e-commerce system 1004 may include data storage 1008, which may include one or more databases or other data structures within or accessible to the servers. The data storage 1008 may include merchant data 1010 regarding merchant accounts with the e-commerce system 1004, including merchant identifiers and settings and parameters for respective merchants. The data storage 1008 may further include product records 1012. In some cases, each merchant account has a set of associated product records 1012 reflecting the products or services offered via that merchant account. The product records 1012 may include details regarding one or more products, images, pricing, shipping information, technical parameters, textual description, reviews, or other data regarding the product. Product records 1012 may be grouped into classes and/or subclasses.

The user devices 1002 may include a web browser 1020 and/or a mobile application 1022 through which the user device 1002 is able to connect with the e-commerce system 1004 in order to browse a merchant's online store interface so as to view available product or services. The web pages or other resources served to the user devices via the web browser 1020 or mobile application 1022 may be generated or obtained from the stored product records 1012. As a user device 1002 searches or browses products from a particular merchant, the e-commerce system 1004 may retrieve the corresponding product records 1012 for causing display of the product data on the user device 1002.

The e-commerce system 1004 includes an access controller 1024. The access controller 1024 may be implemented by way of suitable computer executable code for regulating access to some or all of the product records 1012 and other data within the e-commerce system 1004. In one example, the access controller 1024 may limit access to some or all of the features or options available by way of user authentication. That is, user's, such as customers or merchants, accessing the e-commerce system using a remote device must provide valid user credentials to be authenticated. Once authenticated, the user is granted the level of access corresponding to their user type or class. A merchant user may gain access to edit its product records 1012, store design, and some of its merchant data 1010. In some cases, a customer user need not provide any user credentials and is permitted to browse merchant stores or to make purchases in a "guest" mode. If credentials are provided, the user may be "logged in" to a user account that enables access to additional features or saved preferences, including purchase history, loyalty points, saved purchase credentials (e.g. credit card details), or other user-specific features.

In this example, the network 1006 further includes a blockchain network 1030. The blockchain network 1030 may operate in accordance with a blockchain protocol, such as Bitcoin or Ethereum, as examples. The user device 1002 may include a wallet application 1032, which is a blockchain application on the user device 1002 that may store blockchain-related data. In some cases, the wallet application 1032 may securely store public and private key pairs associated with the user device 1002. The public keys may be shared and made publicly available for the purpose of receiving blockchain-based data transfers of fungible or non-fungible tokens. The private keys may be stored securely and confidentially and may be used by the wallet application 1032 in certain signature operations for providing digital signatures that prove ownership of corresponding public keys, among other things. The wallet application 1032 may be referred to as a simplified payment verification (SPV) client in some implementations.

The wallet application 1032, in this example, includes NFT data with regard to one or more NFTs associated with the user device 1002. The NFT data may include, in some cases, an NFT identifier, a public key associated with the wallet (e.g. a wallet identifier), a transaction identifier associated with ownership of the NFT, an NFT collection identifier, a smart contract identifier, or other such data regarding the NFT and/or its ownership by the user device 1002. In some cases, the NFT data may include additional data regarding the NFT itself, such as associated media (e.g. image or video), attributes, or a textual description.

In some implementations, the wallet application 1032 may be configured to provide NFT data to the e-commerce system. For example, the wallet application 1032 may use the open-source WalletConnect protocol to connect and interact with decentralized applications (dApps). Other protocols may be used in other implementations. In some cases, the connect protocol may be used to connect the wallet application 1032 to the mobile application 1022. In some cases the connect protocol may be used to connect the wallet application 1032 to the web browser 1020. In short, the wallet application 1032 is configured such that it is able to securely provide NFT data to the e-commerce system regarding NFTs purportedly owned by the user device 1002, and/or to authenticate the user device's 1002 ownership of certain public keys associated with particular NFTs recorded on the blockchain network 1030.

The access controller 1024 may be configured to control access to one or more of the product records 1012 based upon access control rules 1026. Each access control rule 1026 may specify one or more product records 1012, or a class of product records 1012, to which it applies. Each access control rule 1026 may be associated with a specified one of the merchant accounts. Each access control rule 1026 may further include a condition for obtaining access to the associated one or more product records 1012 or class of product records 1012. The condition, in these examples, includes ownership of one or more NFTs having a specified set of attributes.

The e-commerce system 1004 may further include a rule generation engine 1028 configured to identify a set of NFT attributes, detect an association between the set of NFT attributes and one or more of the product records 1012, and to generate a new access control rule 1026 for access to the one or more of the product records 1012 based on ownership of an NFT having the set of NFT attributes. When a user device 1002 seeks to access one of the product records 1012, the e-commerce system 1004 determines whether a stored one of the access control rules 1026 applies to that product record 1012 and, if so, then the access controller 1024 determines whether the user device 1002 meets the requisite condition(s) in the access control rule 1026. The condition may include ownership of an NFT having certain attributes. Accordingly, the e-commerce system may obtain (or may have previously obtained) NFT data from the user device 1002 and may query the blockchain network 1030 to validate that the user device 1002 is associated with an NFT as owner according to the blockchain and that the NFT has the requisite certain attributes. The e-commerce system 1004 may determine from the NFT data provided by the user device 1002 whether one or more of its NFTs has the requisite attributes and then, if so, it may verify ownership of the NFT by querying the blockchain network 1030. In some cases, a smart contract on chain within the blockchain network, and associated with an NFT collection that includes the NFT, may provide an ownership verification function. For example, in the context of Ethereum, an ERC-721 compliant smart contract may provide the ownerOf( ) function for determining the blockchain-recorded owner of a particular NFT.

Figure 2:
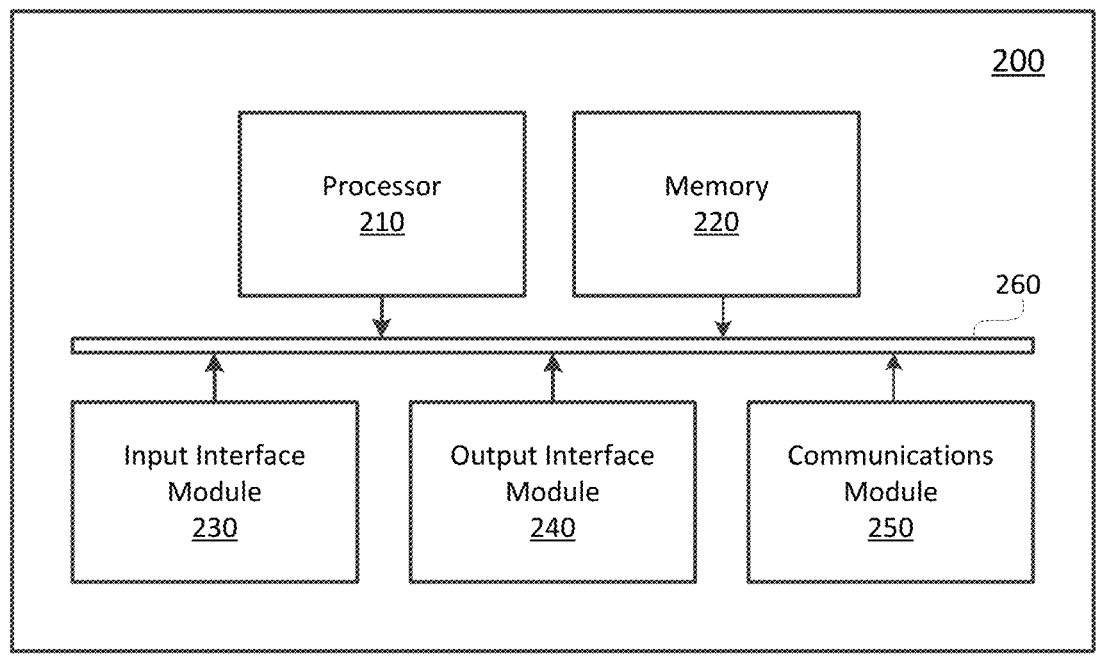
FIG. 2 is a high-level schematic diagram of a computing device.

The e-commerce system 1004 and/or the user devices 1002 may be implemented using one or more computing devices. FIG. 2 is a high-level diagram of an example computing device 200. The example computing device 200 includes a variety of modules. For example, the example computing device 200 may include a processor 210, a memory 220, an input interface module 230, an output interface module 240, and a communications module 250. As illustrated, the foregoing example modules of the example computing device 200 are in communication over a bus 260.

The processor 210 is a hardware processor. The processor 210 may, for example, be one or more ARM, Intel x86, PowerPC processors, or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 200.

The input interface module 230 allows the example computing device 200 to receive input signals. Input signals may, for example, correspond to input received from a user. The input interface module 230 may serve to interconnect the example computing device 200 with one or more input devices. Input signals may be received from input devices by the input interface module 230. Input devices may, for example, include one or more of a touchscreen input, keyboard, trackball or the like. In some embodiments, all or a portion of the input interface module 230 may be integrated with an input device. For example, the input interface module 230 may be integrated with one of the aforementioned example input devices.

The output interface module 240 allows the example computing device 200 to provide output signals. Some output signals may, for example, allow provision of output to a user. The output interface module 240 may serve to interconnect the example computing device 200 with one or more output devices. Output signals may be sent to output devices by output interface module 240. Output devices may include, for example, a display screen such as, for example, a liquid crystal display (LCD), a touchscreen display. Additionally, or alternatively, output devices may include devices other than screens such as, for example, a speaker, indicator lamps (such as, for example, light-emitting diodes (LEDs)), and printers. In some embodiments, all or a portion of the output interface module 240 may be integrated with an output device. For example, the output interface module 240 may be integrated with one of the aforementioned example output devices.

The communications module 250 allows the example computing device 200 to communicate with other electronic devices and/or various communications networks. For example, the communications module 250 may allow the example computing device 200 to send or receive communications signals. Communications signals may be sent or received according to one or more protocols or according to one or more standards. For example, the communications module 250 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 250 may allow the example computing device 200 to communicate using near-field communication (NFC), via Wi-Fi™, via the Ethernet family of network protocols, using Bluetooth™ or via some combination of one or more networks or protocols. Contactless payments may be made using NFC. In some embodiments, all or a portion of the communications module 250 may be integrated into a component of the example computing device 200. For example, the communications module may be integrated into a communications chipset.

Software instructions are executed by the processor 210 from a computer-readable medium. For example, software may be loaded into random-access memory from persistent storage within memory 220. Additionally, or alternatively, instructions may be executed by the processor 210 directly from read-only memory of the memory 220.

Figure 3:
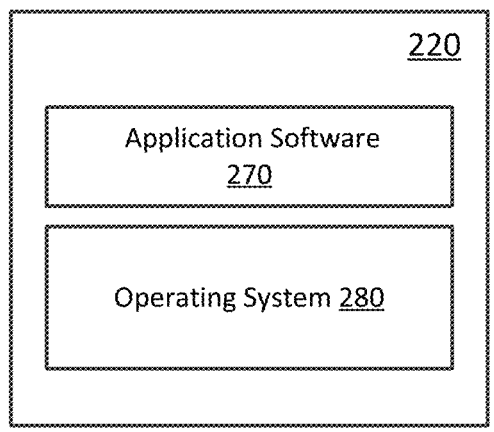
FIG. 3 shows a simplified organization of software components stored in a memory of the computing device of FIG. 2.

FIG. 3 depicts a simplified organization of software components stored in memory 220 of the example computing device 200. As illustrated, these software components include, at least, application software 270 and an operating system 280.

The application software 270 adapts the example computing device 200, in combination with the operating system 280, to operate as a device performing a particular function. While a single application software 270 is illustrated in FIG. 3, in operation, the memory 220 may include more than one application software and different application software may perform different operations. Example application software 270 includes the wallet application 1032 (FIG. 1), the web browser 1020 (FIG. 1), or the mobile application 1022 (FIG. 1).

The operating system 280 is software. The operating system 280 allows the application software 270 to access the processor 210, the memory 220, the input interface module 230, the output interface module 240 and the communications module 250. The operating system 280 may, for example, be iOS™, Android™, Linux™, Microsoft Windows™, or the like.

Figure 4:
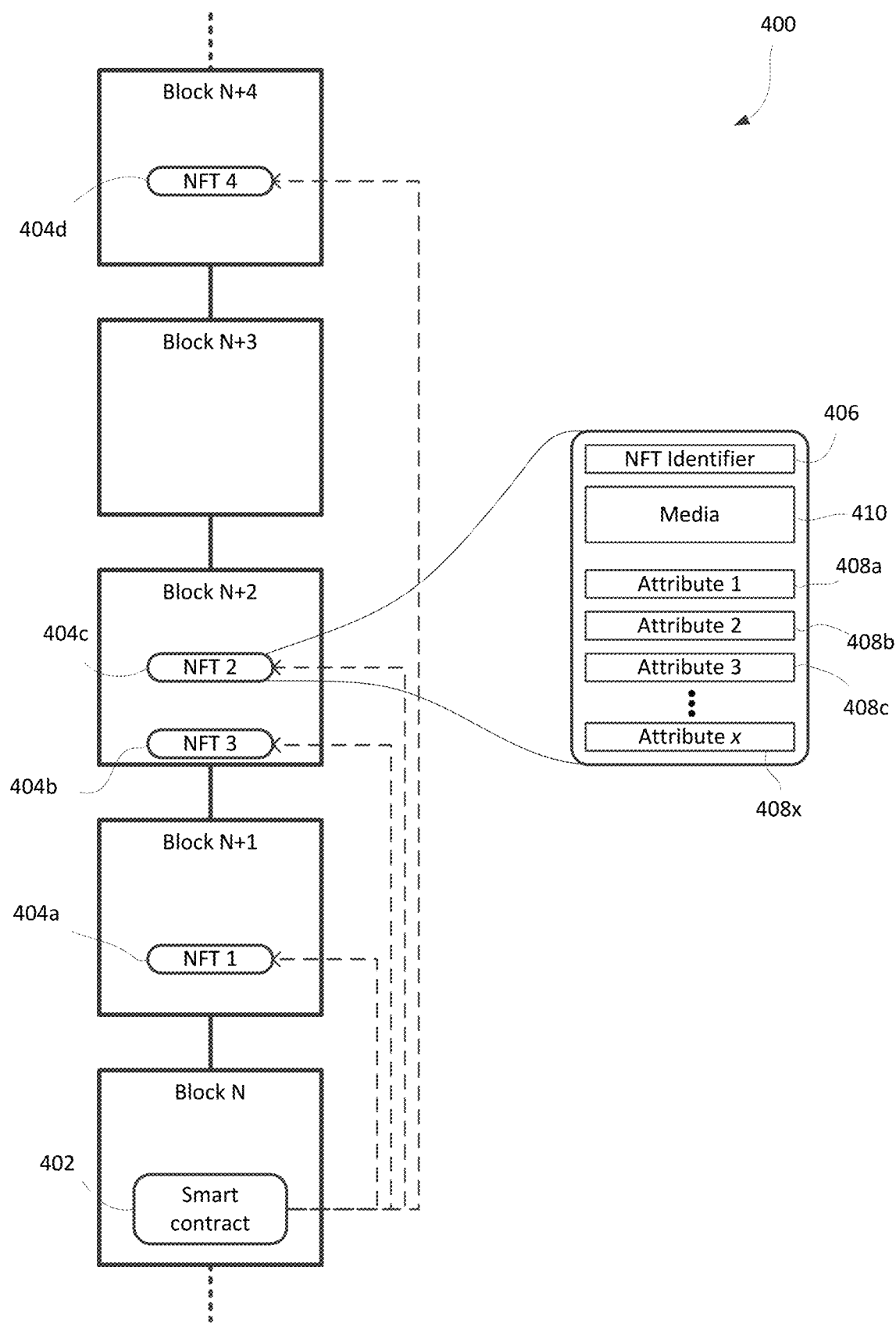
FIG. 4 graphically illustrates an example segment of a blockchain recording non-fungible tokens.

Reference is now made to FIG. 4, which illustrates an example blockchain 400. The blockchain 400 is a record of validated transactions grouped into blocks and successfully "mined" by one of the mining nodes within a blockchain network. Each block is immutable and is linked to the previous block by way of incorporating a hash of the previous block header within its own header. The functioning of a blockchain network and the variations possible under different blockchain protocols will be appreciated by those ordinarily skilled in the art.

A smart contract 402 may be implemented within the blockchain 400. In some cases, like with the Ethereum blockchain, the smart contract 402 may be executable code recorded on chain and may include functions that are available for execution by having those functions called in subsequent transactions. In this example, the smart contract 402 relates to NFT generation and/or management. That is, the smart contract 402 may have functions for minting NFTs, determining/validating ownership of those NFTs, transferring ownership of those NFTs from a current valid owner to a new owner. It will be appreciated that "ownership" is generally associated with an address, e.g. a public key value which may sometime be referred to as a wallet identifier. A computing device that holds the corresponding private key may be used to authenticate the computing device as the owner of that public key, thereby enabling the computing device to take actions with respect to the "owned" NFT, such as transferring it to a different public key.

When the smart contract 402 is used to mint NFTs, the minting and ownership data for that NFT may be recorded on the blockchain 400, as indicated by 404a, 404b, 404c, 404d (collectively, 404). In some cases, the NFT data recorded on-chain includes, for example, a unique NFT identifier 406. In some instances, the NFT data recorded on chain may include one or more media files 410 or URI link(s) to one or more media files that are the subject of the NFT. The media files 410 may include, for example, an image file, a video file, an audio file, or combinations thereof.

The NFT data may further include one or more NFT attributes 408 (shown as 408a, 408b, 408c, . . . , 408x). The NFT attributes 408 may include contextual information regarding the NFT, such as a minting date, a category, data regarding the features or characteristics of the media file 410, or any other such attributes of the subject matter of the NFT. The NFT attributes 408 may be in the form of a list of name-value pairs, a hierarchical tree of name-value pairs, a nested structure of attributes, a linked list, an array, or in any other suitable data structure format.

The NFTs 404 minted and managed by the smart contract 402 may be considered part of a collection of NFTs in that they are all governed by the same smart contract 402. In some cases, a collection of NFTs may be minted using different smart contracts or using non-blockchain code for generation of the NFTs and off-chain software for causing recordal of the NFTs on chain in blockchain transactions. Such NFTs may nevertheless be considered part of a single collection of NFTs if they are linked in such a manner as to form a collection, such as having a link or reference within each NFT identifying those NFTs as belonging to a specific collection. In one example, an NFT collection may have a single NFT.

Figure 5:
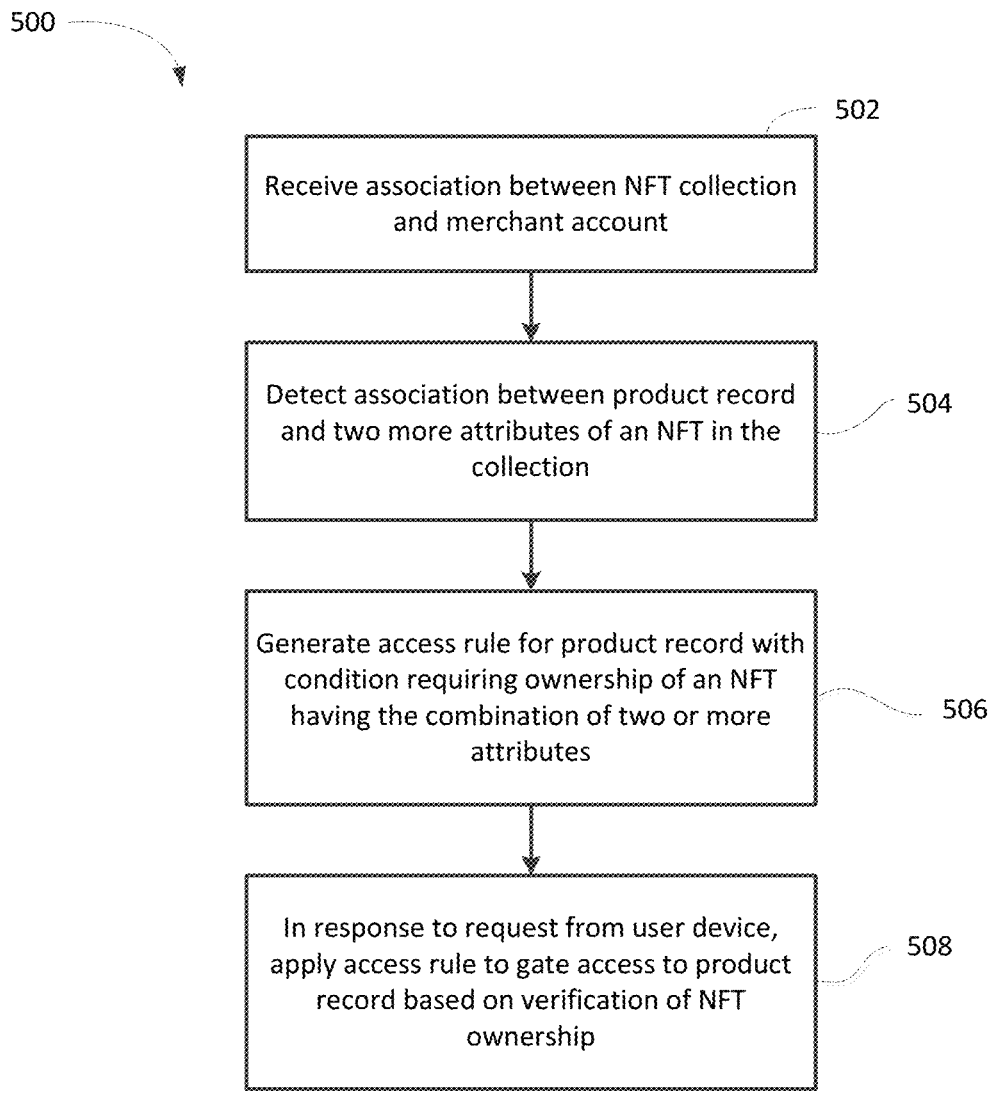
FIG. 5 shows, in flowchart form, one example method of automating controlled access to online resources.

Reference will now be made to FIG. 5, which shows, in flowchart form, one example method 500 of controlling access to an online resource. The method 500 may be implemented by a computing platform, such as an e-commerce platform in some cases. In particular, the method 500 may be implemented by way of suitably-programmed software instructions stored in memory on a computing device which, when executed by one or more processors of the computing device, cause the computing device to carry out the described operations. In some cases, the method 500 may be implemented by one or more servers forming an e-commerce platform or system, such as the e-commerce system 1004 (FIG. 1). Although the following method 500 is described in the context of an e-commerce implementation, it will be appreciated that the operations of the method 500 may be generalized to apply in applications and contexts other than e-commerce.

In operation 502, an association is received between an NFT collection and a merchant account. That is, a link is established between the NFT collection and the merchant's products. The association may be received by the e-commerce system from a merchant via a merchant device. The merchant may determine that their products are to be associated with a particular NFT collection. For example, the merchant may market sports-related items or memorabilia and may determine that some of the product catalog may be advantageously limited to buyers having a sufficient affinity for particular sports teams, players, or other characteristics. That affinity may be based on ownership of one or more NFTs from a sports-related NFT collection. In another example, an NFT collection may relate to a particular musical artist or style of music, and the merchant may determine that products or services relating to that artist or style may advantageously be limited to buyers having a sufficient affinity that they own one or more NFTs from that NFT collection.

The association may be between the NFT collection and all of the merchant's products in some cases. In other cases, the association may be between the NFT collection and a subset of the merchant's products. For example, the subset may be a specific class of products, such as shoes, concert tickets, etc. In some cases, the subset may be a limited access class of products, such as early release tickets, or early-access products, or limited edition items. In some cases, the subset may be a particular promotion associated with identified products, such as discounted products. That is, the NFT collection may be linked to a level of discount applicable to a set or subset of products.

The NFT collection may have a set of existing NFTs recorded on the blockchain in some cases. It may also subsequently generate new NFTs on a periodic or regular basis, and may record the minting of those NFTs on the blockchain. The blockchain may be searched to identify the existing NFTs in the collection or searched periodically to identify new NFTs in the collection. In some cases, the smart contract may provide a function enabling a query and response regarding NFTs in the collection. In some cases, a third-party website or marketplace, such as OpenSea™ or the like, may be searchable to obtain data regarding existing or new NFTs in a collection.

The e-commerce system may be configured to obtain data regarding the existing NFTs in the collection, whether from the blockchain or from a third-party source, and analyze them to identify combinations of attributes. It may further or alternatively be configured to detect creation or minting of one or more new NFTs in the collection and to obtain data regarding those new NFTs, whether from the blockchain or from a third-party source, and to analyze them to identify combinations of attributes. The combinations of attributes may include sub-sets of attributes. That is each combination may include fewer than all attributes of the NFT.

In operation 504, the e-commerce system detects an association between one or more of the product records for the merchant and a combination of two or more attributes of an NFT. In one example detection is based on keyword matching. That is the attributes of the NFT are keyword searched against the details of the product records. If two or more of the attributes match details of the one or more products records, an association may be established. In some cases, the matching is based in certain portions of the product records, such as the title, product attributes, and/or features. In some cases, the product record may include textual or narrative description that may be used. In some cases, a confidence measure may be determined for the match. The confidence measure may be based on the number of NFT attribute to product record keyword matches. It may also or alternatively be based on the portion of the product record matched. For instance, a match to the title of the product may be more heavily weighted than a match to a word in a textual description. In some cases, the e-commerce system may detect the association only if the confidence measure exceeds a threshold level. The threshold level may be tunable and may be adjusted by the merchant to provide for detection of fewer or more associations.

In some implementations, detection may employ a machine learning model trained to detect associations between NFT attributes and product records. The machine learning model may be trained on a set of training data across multiple merchants having disparate sets of product records and multiple NFT collections to generate a single machine learning model applicable to many NFT collections and merchants. In some cases, the machine learning model may be trained by training data across multiple merchants' product records but for a single NFT collection, such that it is tuned for use with that particular NFT collection. In yet another implementation, the machine learning model may be trained using training data for multiple NFT collections but across the product records of a single merchant or a class of similar merchants having similar product records, so as to tune the model for use with that merchant or merchants of that class. The combination or sub-combination of NFT attributes for a new NFT may then be provided to the model together with the product records of the merchant and the model may produce results that include one or more associations between the combination of NFT attributes and one or more of the product records. In some cases, of course, there is no detected match between NFT attributes and any of the merchant's product records.

In some cases, the NFTs may conform to one or more token standards (e.g. ERC-721, ERC-1155, etc.) and may contain properties listed in a JSON Schema or other representation of a hierarchical tree of name-value pairs, or other such data structure or schema. An e-commerce system may contain a product database containing product records and having various tags, fields, and metafields. The NFT attributes and the tags, fields, or metafields in the product database may have matching strings or substrings that may be the basis for detecting an association. In some cases, the tags, fields and/or metafields in the product database may contain references to names, values, or name-value pairs found in the NFT JSON.

When an association is detected between NFT attributes and one or more product records, the system may then generate an access control rule in operation 506. The access control rule may set a condition for accessing the one or more product records, where the condition is ownership of an NFT having the NFT attributes detected in operation 504. In many cases, more than one NFT in the NFT collection may satisfy these conditions since even if all NFTs in the collection are a unique combination of attributes and/or media, two or more of them may share a subset of attributes. For example, more than one NBA™ TopShot NFT may feature Lebron James. More than one may feature the L.A. Lakers. More than one may involve a video clip of a dunk. These various attributes may overlap in many of the NFTs available in that collection, but each of them may involve a completely unique total combination of media and attributes.

The access control rule generated may be implemented automatically to gate access to that merchant's product records, or may be saved and output as a proposed access rule. The output of the proposed access rule may include one or more notifications to addresses or devices associated with the merchant account providing details of the proposed access control rule. In some cases, the notification may include one or more a selectable links for triggering an approval/disapproval response message to the system. If approved, then the access control rule is implemented and future requests from a user device for access to the one or more product records may be approved and permitted only if the user device meets the conditions, i.e. is able to provide NFT data verifying ownership of one or more NFTs having the specified NFT attributes.

As indicated by operation 508, when a request for access to the one or more product records is received by the e-commerce system, it identifies that an access control rule applies to those product records and it determines whether the requesting user device meets the conditions for access. In particular, it determines whether the user device owns an NFT having the specified NFT attributes. As described above, the user device may provide NFT data in the process of accessing the e-commerce system, and the e-commerce system may authenticate that data with the blockchain network. In some cases, when the e-commerce system identifies that an access control rule applies, it may send a challenge and receive a response from the user device for NFT data, and it may then authenticate ownership by querying the blockchain network. If the user device ownership of an NFT meeting the criteria is authenticated, then access is granted. Otherwise, access may be denied.

Figure 6:
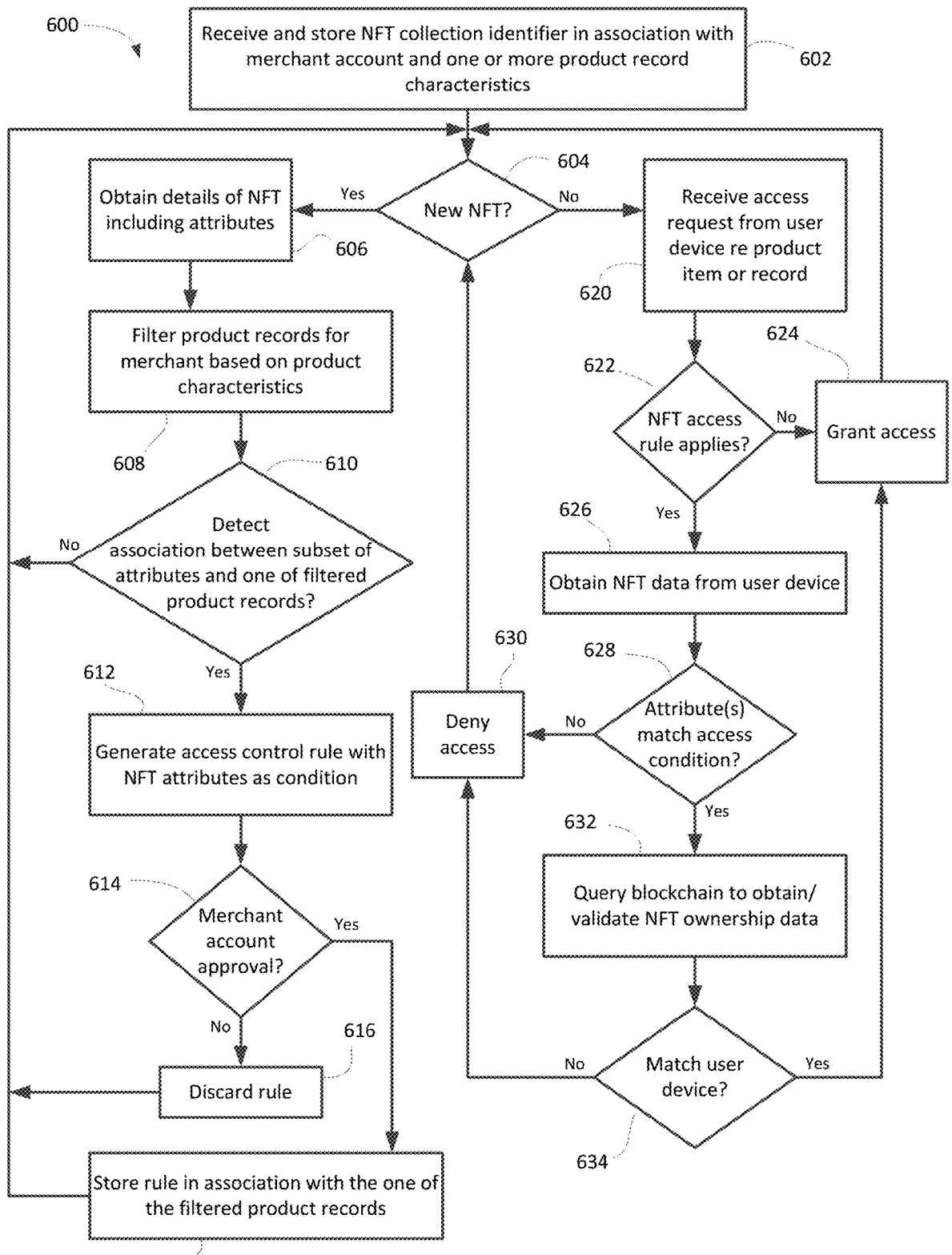
FIG. 6 shows, in flowchart form, another example method of automating controlled access to online resources, such as product records.

A more detailed illustrative example method 600 is shown in flowchart form in FIG. 6. The method 600 may be implemented by way of suitably-programmed software instructions stored in memory on a computing device which, when executed by one or more processors of the computing device, cause the computing device to carry out the described operations. The method 600 may be implemented by a computing system, such as an e-commerce platform in some cases. In some cases, the method 600 may be implemented by one or more servers forming an e-commerce platform or system, such as the e-commerce system 1004 (FIG. 1).

In operation 602, the e-commerce system may receive and store an association between an NFT collection and a merchant account. The association may be storing NFT collection identifier data in relation to the merchant account. The link between the merchant and the NFT collection may be established, for example, by the merchant selecting the NFT collection in a merchant interface the enables the linking or association of a merchant account with one or more NFT collections.

The linking of the NFT collection to the merchant account may further include identification of one or more product record characteristics or categories. That is, the NFT collection may be linked to a particular subset of the products or services available from the merchant. For example, the NFT collection may be designated as related to sports merchandise. As another example, the NFT collection may be designated as related to collector's edition or limited edition product items. As a further example, the NFT collection may be designated as related to early access product items. In many cases, the product records that the merchant has designated as being associated with the NFT collection are a set of product records that are not normally available to regular users. That is, the product records are discounted, limited edition, early access, or exclusive access items that are not normally available through the merchant's online store. Accordingly, the generation of access rules in this context is to identify new conditions enabling access to these otherwise unavailable items, rather than imposing new restrictions that block access to an otherwise available item.

In operation 604, the system determines whether a new NFT from the NFT collection has been minted. The system may receive a notification from a third party computing system associated with the NFT collection or a marketplace hosting the NFT collection. The system may periodically search or query the blockchain or a third-party marketplace to identify newly-minted NFTs. The system may detect a new NFT when a user device accesses the system and provides NFT data to the system through a wallet connect operation, and the system thereby becomes aware of a new NFT that belongs to the NFT collection.

On identifying a new NFT from the NFT collection, in operation 606 the system obtains details regarding the NFT and, in particular, its NFT attributes. The system may obtain those details from the user device that provides notice of the new NFT via a wallet connect operation. The system may obtain those details from a third party marketplace hosting the NFT. The system may obtain those details from the blockchain that recorded the minting of the NFT. Irrespective of the source, the system determines the NFT attributes.

In operation 608, the system filters the merchant's available product records based on the product record characteristics with which the NFT collection is associated. That is, if the NFT collection is specified in the merchant data as being associated with limited edition product items, then the system filters the merchant's product records to select out only the product records for limited edition items. As another example, if the NFT collection is specified in the merchant data as being associated with merchant products that relate to a particular recording artist, then the merchant's product records are filtered to exclude products unrelated to that particular recording artist. The filtering may be based on tags, keywords, or other mechanisms for selecting relevant records. In some cases, the NFT collection may be associated with all of the merchant's product records, such that no filtering occurs.

Having obtained the NFT attributes and a filtered set of merchant product records, in operation 610 the system determines whether there is an association between the NFT attributes or a subset of the NFT attributes and one or more of the filtered product records. This determination may be based on a machine learning model for identifying associations between NFT attributes and product records in some cases. The determination may be based on keyword matching between NFT attributes and details of product records in some cases. The determination may employ a fuzzy matching algorithm in some cases.

The determination process may test various combinations and sub-combinations of NFT attributes to identify whether a subset of attributes is relevant to one of the product records. A confidence measure may be evaluated for each subset of NFT attributes to score the degree of association between that subset and each of the product records. A threshold confidence score may be required for an association to be detected. In some cases, the highest scoring association between the various possible subsets and product records is identified. In some cases, once a subset of NFT attributes is identified as associated with at least one of the product records with more than a threshold confidence score, the system then identifies all product records that have an association with that subset of NFT attributes at more than the threshold level of confidence.

If no association is identified, then system returns to operation 604. If an association is detected in operation 610, then in operation 612 the system automatically generates an access control rule. The access control rule has as a condition ownership of an NFT from the NFT collection having the subset of NFT attributes. In some cases, the subset of NFT attributes is a single attribute. In some cases, it is a combination of two or more of the NFT attributes. In some cases it is all of the NFT attributes. The access control rule is for access to the one or more product records identified in operation 610 and the condition for access is ownership of one or more NFTs having at least the specified NFT attribute(s).

In one example, the product record may already have an access control rule that only permits users to access the product record under certain conditions (e.g. membership in a loyalty program, previous purchase of a particular item, ownership of one or more pre-identified NFTs or NFTs having certain attributes). In this case, operation 612 may involve generation of a new condition for the existing access control rule—that is, to add an <OR> condition specifying ownership of an NFT having the specified NFT attributes.

In operation 614, the system may obtain merchant account approval of the automatically generated access control rule. The merchant account approval may be preset in the merchant account, i.e. to automatically accept and implement auto-generated access control rules. In some cases, operation 614 includes sending a notification to a merchant address regarding the generated access control rule and receiving a response approving or disapproving of the proposed rule. If the proposed rule is rejected, then it is discarded without implementation as indicated by operation 616. If approved, then the access control rule is implemented in operation 618. This may include saving the access control rule in association with the one or more product records, updating a stored set of merchant access control rules in data storage, and/or notifying or providing the new rule to an access controller within the system. In some cases, this may include updating an existing access control rule to reflect addition of a new condition.

The method 600 may further include processes for applying the access control rule. As shown in operation 620, the system may receive a request from a user device to access a particular product record. The request may be an HTTP request or the like. The request may come from the user device over a network, wherein the user device is executing web browser software or an e-commerce mobile application. The request may be a request for a web page or a request for product record data for rendering within the mobile application, as examples.

The system determines in operation 622 whether the requested product record is subject to access control restrictions. This may be determined based on a flag or other setting in the product record in some cases. It may be determined by querying a database or other record of restricted product records using an identifier for the requested product record, in some cases. The determination may be made by an access controller within the system. Operation 622 may include identifying and retrieving the one or more access control rules stored in memory that are applicable to the requested product record.

If the product record is unrestricted, then it is provided to the user device in operation 624. If the product record is subject to access control restrictions, then in operation 626 the system obtains NFT data from the user device. The NFT data may be obtained from the user device earlier, such as when the user device initiates browsing of the e-commerce system. In some cases, the initiation of browsing includes initial authentication operations that include obtaining NFT data from the user device.

In operation 628 the system determines whether the NFTs purportedly owned by the user device meet the criteria of the access control rule. That is, the system may determine from the NFT data whether the user device owns an NFT from the NFT collection and having the one or more NFT attributes specified in the access control rule condition. In some cases, the NFT data provided by the user device may include the NFT attributes. In some cases, the system may need to query the blockchain network or a third-party computing system, such as an NFT marketplace, for data specifying the NFT attributes based on an NFT identifier provided by the user device.

If the user device does not purport to own an NFT having the requisite attribute(s), then the system may deny access to the requested product record in operation 630. In some cases, denying access to the requested product record may include providing access to an associated unrestricted product record. For instance, if the requested product record is a limited edition version of a product item and the user device lacks the necessary NFT ownership to obtain access to that item, the user device may be provided with a product record for the same product item, but a regular version rather than the limited edition version.

When the NFT attributes for one of the NFTs owned by the user device match the access condition, the system may verify that the NFT is owned by the user device by querying the blockchain in operation 632. The system may perform this verification earlier in the method 600, such as when it obtains NFT data from the user device. The verification may include querying a blockchain node and providing an NFT identifier as part of the query. The response message may identifier the owner of the NFT identified in the query. The owner data may be a wallet address (e.g. wallet identifier), for example, or other identifier that may be associated with the user device. The NFT data obtained from the user device may include one or more wallet addresses or wallet identifiers and may include proof of ownership of those addresses, such as by way of one or more cryptographic signatures. In some cases, the blockchain query may be a query that provides one or more wallet addresses, and the response message may include a list of all NFTs owned by those wallet addresses. In some cases the response may include the NFT attributes and related data. The verification of ownership in operation 632 may occur earlier in the method 600 or after determining that the NFT attributes match the access control rule condition in operation 628.

Based on the ownership verification, the system denies access to the requested product page if ownership by the user device is not confirmed, as indicated by operation 630. If ownership is verified, then the system provides the requested product record to the user device in operation 624.

Figure 7:
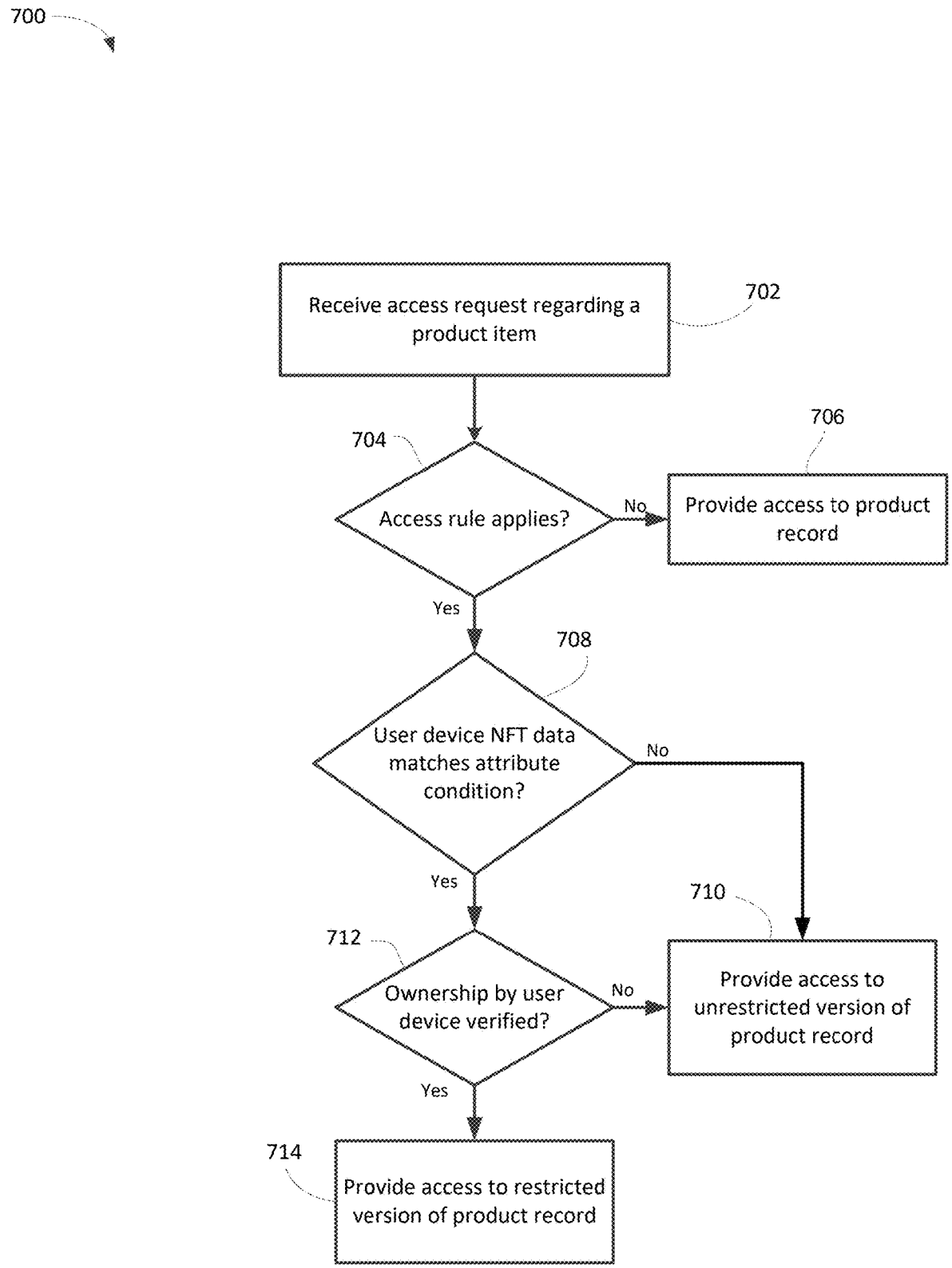
FIG. 7 illustrates an example method of controlling access to a restricted product record.

FIG. 7 illustrates another method 700 of gating access to a product record based on NFT ownership. In this example method 700, a product item has both a restricted product record and an unrestricted product record. The restricted product record may reflect a discounted price, a limited edition version, or other exclusive features. The unrestricted product record may reflect the normally-available version of the product item and/or usually pricing.

In operation 702, the system receives a request for access to the product item from a user device. In operation 704 it determines whether the product item is subject to an access control rule. If not, then it provides the user device with access to the corresponding product record in operation 706.

If an access rule applies to the product item, then in operation 708 the system determines whether the user device's NFTs have NFT attributes that match the condition specified in the access control rule. If one of the NFTs has the required attribute(s), then the system verifies if it is owned by the user device, as indicated by operation 712. The verification operation may include querying a blockchain network node to confirm ownership of the NFT. In some cases, operations 708 and 710 may be performed together or in a different order.

If none of the user device's NFTs meet the access rule condition or if ownership by the user device cannot be verified, then the system provides the user device with the unrestricted version of the product record. If ownership by the user device is verified and the NFT meets the specified criteria in the access rule, then the system sends the user device the restricted version of the product record in operation 714.

In this manner, the method 700 ensures that when a request for access to a product item is received by the system, the system provides access to either the unrestricted product record or the restricted product record, dependent upon whether the system can verify that the user device is associated by ownership with an NFT that meets the criteria specified in the applicable access control rule. This may be used to ensure that only authorized devices having one or more NFTs matching the conditions are provided with access to the restricted product record. That restricted product record may reflect a limited-edition version of the product item, discounted pricing for the product item, early access or expedited access to the product item, or other special limited-access features.

In any of the above-described example methods or processes it will be understood that certain operations described as occurring in sequence may be implemented in a different sequence or carried out in parallel without impacting the overall functioning of the method or process.

Access Control Based on Verified Event Record

As noted above, access control systems may rely on pre-generated rule sets that specify conditions for granting or denying access to a resource. In response to a request for access from a requesting device, the system retrieves the access control rules and assesses whether the requesting device and/or its present context meet the condition or combination of conditions specified in one of the access control rules. Access to the resource is then granted or denied based on that assessment. In this manner, the system gates access to the resource based on the condition or combination of conditions.

Merchants in an e-commerce context may be interested in providing access to certain product records only to "qualified" users/purchasers. This may be embodied in access control rules that attempt to impose a condition on the requesting user device that it be associated with evidence of qualification. That evidence may include a user status or level in an online game, a history of purchasing certain goods or a certain quantity of items, membership or past participation in a certain event, etc. In order to determine whether a requesting device is qualified, an e-commerce platform needs to verify based on stored data associated with the requesting device whether it has the requisite qualifications. This may be based on stored data regarding a history of transactions and/or events that occurred via the e-commerce platform in association with that requesting device (or its associated user). In some cases, the qualifications may be based on data or events outside the e-commerce system, in which case the e-commerce platform may obtain and trust that data from the requesting device.

In many implementations, a smart contract may be created for the purpose of minting and/or tracking NFTs. The Ethereum blockchain network has an associated standard, ERC-721, providing a reference implementation of a smart contract for tracking and managing NFTs. Various other standards, such as ERC-1155 for non-fungible tokens and/or ERC-20 for fungible tokens, may apply. A smart contract is executable computer code recorded on the blockchain that, when properly "called" in a subsequent blockchain transaction, executes so as to carry out its defined operations. In the case of an NFT smart contract, a minting operation may cause the smart contract to produce a new unique NFT that corresponds to a particular one unique NFT. That unique NFT may be digital art, an images, a video, or a combination thereof in some examples. Each NFT may have associated attributes or characteristics. Example attributes include the elements pseudo-randomly selected for generation of the digital image, such as specific eyes, mouth, accessories, etc., for an image of a character. Another set of example attributes may be the context or characteristics of a particular image or video, such as the identity of the person/player featured, the team or teams involved, the date, the score, the type of play, or other such features. Once NFTs are minted, they may be made available through an online marketplace in some cases. Various wallets, i.e. network-connected computing devices with blockchain wallet software operating thereon, may initiate blockchain transactions to obtain and/or transfer NFTs. Ownership of an NFT by a wallet is recorded on chain and is verifiable by third parties. In some cases, a wallet may own a plurality of NFTs. The ownership of those NFTs may be verifiable by third parties based on a query to the blockchain network, i.e. to a blockchcain node, providing data from the wallet, such as a public key associated with the wallet. In some cases the query may identify the NFTs by way of unique identifiers, or by way of an identifier for the NFT collection to which they belong. The blockchain node may respond by providing verification that the public key provided is associated with the NFT as reflected in the data recorded on the blockchain. The NFT smart contract may provide functions for verifying NFT ownership data.

While many NFTs have been generated to represent ownership interest in some auto-generated digital media, in other cases NFTs may be used as a "proof-of-purchase" or a receipt or record of ownership or investment. In this context, NFTs may indicate a history of purchases of certain product items and, in some cases, record current ownership of those product items. An NFT may be as simple as a record of purchase (receipt) for various common items from a grocery store. In some cases, the NFT may be a record of ownership of a non-perishable real-world item, such as real estate, a financial instrument, an automobile, etc.

In yet other examples, NFTs may be used as a "ticket" for access or as a "proof-of-attendance". For instance, a concert ticket may be minted and recorded as an NFT, which when validated at a venue (e.g. using a QR code scanner or the like to obtain a wallet identifier and an NFT identifier and then validate ownership via a blockchain query) grants the holder of the user device access to the concert. As another example, an NFT may record the fact of attendance at an event, such as a training course or a social event. NFTs may signal membership in a club, attendance at a restaurant, participation or level or progress in an online game, or any other such events.

In some situations, NFT ownership may be used as a proxy for interest or investment in particular industries, sports, or areas of interest. The ownership of such NFTs may serve as a mechanism for qualifying a computing device as having sufficient credentials to meet an access control rule. That is, ownership by a computing device of one or more particular NFTs may entitle that computing device to access or resources not otherwise available. This may enable a merchant to impose access conditions that are based on qualification criteria outside the control of the e-commerce platform but in a manner that ensures the criteria are independently verifiable and authenticated. The e-commerce platform is thereby alleviated of the burden of maintaining extensive data records regarding external events for the purpose of determining whether potential purchasers are qualified.

Advantageously, example systems and methods described below enable a system, such as an e-commerce platform, to implement and apply access rules for online resources that are based on ownership data with regard to one or more NFTs having one or more specified attributes.

In some examples, the online resource may be a webpage, server login, computer game, livestream, or other such online resource to which access may be controlled. In an illustrative example, the online resource may be an e-commerce product or service. That is, access to one or more products or services available via an e-commerce system or platform may be controlled based on ownership of one or more NFTs having certain characteristics or attributes. In some cases, the access is to a version of a webpage or other online resource associated with the product or service that includes a discount or incentive not otherwise available for that product or service. The online resource may be accessed by a computing device via a webpage or mobile app interface, wherein a remote server, e.g. an e-commerce platform, determines that access by the computing device is permitted based on verification that one or more NFTs meeting the access conditions are associated with the computing device. Determining that the NFTs are associated with the computing device may be based on obtaining blockchain data from a wallet application installed and operating on the computing device and validating that blockchain data via a blockchain network.

In the example case of an e-commerce platform, a merchant account may set an access rule based on one or more NFTs or combinations of NFT attributes. The merchant account may designate the NFT or NFT attributes as associated with all of the merchant's available products or with a subset of the merchant's available products. In some cases, the subset may be a certain category of limited access products, such as limited edition, discounted, or early access versions of the products.

It will be appreciated that in some cases, only one NFT may have the specified combination of attributes. In some other cases, many NFTs may have the specified combination of attributes. The combination may be a single attribute in some examples. The combination of attributes may not include all types of attributes of the NFTs. For example, the combination of attributes in a digital art context may specify a particular style of hat and eye colour. Other attributes of the digital art, including mouth, accessories, etc., may not be part of the condition. In another example, in the context of a sports video clip NFT, like NBA™ TopShots, the condition may specify a particular player, e.g. LeBron James, and a particular type of play, e.g. dunk, but the teams involved, the date, and score may not be part of the condition. In some cases, the attributes relate to past purchases from third-party merchants. The attributes may relate to past purchase of particular product items or classes of product items. The attributes may specify attendance at a past event, such as a concert by a particular artist or group of artists, or purchase of an album or songs from a particular artist. The attributes may specify membership in a group, such as a particular fan club, a political party, an advocacy group, etc.

The third party NFTs are not necessarily issued by (minted) or tracked by the e-commerce system; i.e. they are "unconnected" to the e-commerce system insofar as the e-commerce system was not involved in their minting or in managing them. The e-commerce system is not necessarily a part of the blockchain networks upon which the NFTs are minted and recorded. Nevertheless, the e-commerce system is capable of obtaining details regarding the NFTs from user devices and obtaining and/or validating ownership data regarding the NFTs from the blockchain network, thereby gating access to product items based on user device history but without the computational and data storage burden of tracking all that user device history directly, particularly with regard to user device interactions with third party systems.

Figure 10:
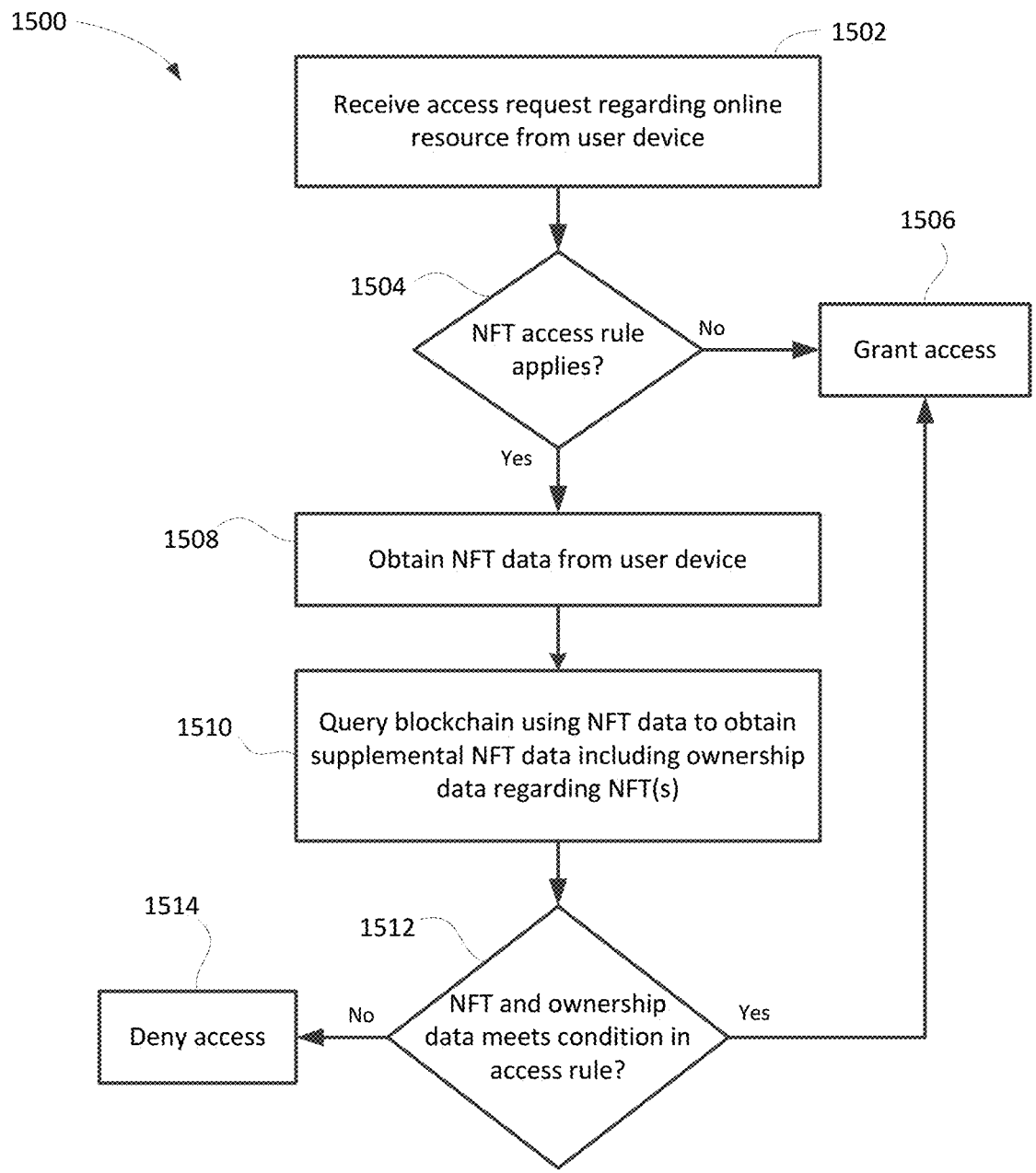
FIG. 10 shows, in flowchart form, another example method of automating controlled access to online resources.

Reference will now be made to FIG. 10, which shows, in flowchart form, one example method 1500 of controlling access to an online resource. The method 1500 may be implemented by a computing platform, such as an e-commerce platform in some cases. In particular, the method 1500 may be implemented by way of suitably-programmed software instructions stored in memory on a computing device which, when executed by one or more processors of the computing device, cause the computing device to carry out the described operations. In some cases, the method 1500 may be implemented by one or more servers forming an e-commerce platform or system, such as the e-commerce system 1004 (FIG. 1). Although the following method 1500 is described in the context of an e-commerce implementation, it will be appreciated that the operations of the method 1500 may be generalized to apply in applications and contexts other than e-commerce.

In operation 1502, the system receives a request for access to an online resource from a user device. The online resource may be a product page or product record that forms part of a merchant's online storefront, in some cases. The request may be an HTTP request in some instances. The request may come from a web browser operating on the user device in some cases, and may come from a mobile application operating on the user device in some cases. In some implementations, the request may be part of a search query from the user device for product items matching search parameters, such that the product record or details from the product record would form part of the search results provided to the user device in response to the query.

When the system retrieves the requested product record from data storage it determines whether the product record is subject to an access control rule in operation 1504. In particular, in this example, the system may determine whether access to the product record is governed by an NFT-ownership-based access rule. If no access rule applies to the product record, then in operation 1506 the user device is provided with the product record or with data from the product record.

However, if an access rule applies to the product record, then the system grants access only if the conditions of the access rule are satisfied. In this example, the system may obtain NFT data from the user device in operation 1508. This may occur earlier in the method 1500 in some cases, such as during an initial login, handshaking, or other authentication process at which time the user device provides NFT data to the system. In some implementations, a WalletConnect operation is implemented at the user device to pass wallet information from the user device to the system, such as data regarding NFTs purportedly owned by the wallet. The NFT data may include one or more NFT identifiers, one or more wallet addresses or wallet identifiers, one or more smart contract identifiers, NFT attribute information, and/or other such data.

The system then, in operation 1510, queries the blockchain network based on the NFT data to obtain ownership data regarding one or more of the NFTs. In particular, the system may identify one or more NFTs from the NFT data that potentially satisfy the condition for access and may then query the blockchain to determine the current (or past) ownership of those one or more NFTs so as to validate that they are (or were) owned by the user device, e.g. that the recorded blockchain ownership data matches the wallet identifier(s). The query may, in some implementations, rely on a smart contract operation for obtaining current ownership data. The query may be a query message set to a blockchain node that is part of the blockchain network, and a response may be received that provides ownership data for any NFT identifiers included in the query message. In some cases, the query may provide one or more wallet identifiers, and the response message may include NFT identifiers owned by those wallet identifiers and/or a history of NFT ownership for those wallet identifiers.

The data received from the blockchain network may be used to assess whether particular NFTs are owned, or were owned, by one or more wallet addresses or wallet identifiers associated with the user device. Control over a wallet address or wallet identifier by the user device may be verified through obtaining a digital signature (e.g. a cryptographic signing of a message) from the user device using the private key associated with the wallet address. By validating user device control over the wallet identifiers/addresses and by obtaining verified data from the blockchain network confirming ownership information, the system is able to independently validate that the NFTs purportedly held by the user device are in fact owned (or were owned, if past ownership is the condition) by the user device. It will be appreciated that a user may have ownership or control over various NFTs that are recorded on-chain as being owned by a particular wallet address or identifier, and that, in such circumstances, ownership would be demonstrated by the user, for example, through the user device by generating and providing a digital signature using a private key that corresponds to the wallet address or identifier. The private key may be stored in a secure area of the user device or may be stored in cold storage or on an external device and may be input to the user device, manually or using a secure input mechanism, in some implementations.

In operation 1512, the system assesses whether the ownership data from the blockchain network indicates that the access control rule condition has been satisfied. In some cases, the access rule specifies that the user device must own one or more NFTs from a specific NFT collection or having one or more specific NFT attributes. In some cases, the access rule may specify that the NFT be owned for more than a minimum period of time, or that the NFT ownership was obtained prior to some point in time. In some cases, the access rule may be satisfied by current or past ownership of the NFT. In some cases, the access rule condition specifies that access is blocked if the user device owns a particular NFT or type of NFT.

In an illustrative example, where the product record being requested relates to a particular musical artist or the like (e.g. concert tickets, backstage passes, new album, early release access to those items, special edition versions, etc.) the access rule condition may specify one or more NFTs that indicate a demonstrated affinity for that artist. For instance, the NFT may evidence membership in a fan club; past purchases of artist merchandise, albums or concert tickets; or attendance at past events involving the artist. None of these items may have been purchased or obtained via the merchant or via the e-commerce platform, such that the e-commerce platform has no stored record evidencing this history. Accordingly, the NFTs provide verifiable evidence of that history that the e-commerce platform can independently validate via the blockchain network when access is requested by the user device. The system is therefore relieved of the burden of obtaining and storing this third-party data and, when provided that data by the user device, is able to independently validate it and prevent fraudulent transactions.

If the system determines in operation 1512 that the NFT ownership information satisfies the access condition, then it provides the requested resource to the user device in operation 1506; otherwise, it denies access to the requested resource in operation 1514. It will be appreciated that denial of access to the requested resource may include providing access to an alternative product record. For instance, when a product item is requested by the user device, the method 1500 may be used to determine whether the user device is provided with a limited-edition restricted-access version of that product or whether the user device is provided with a regular version of that product.

Figure 11:
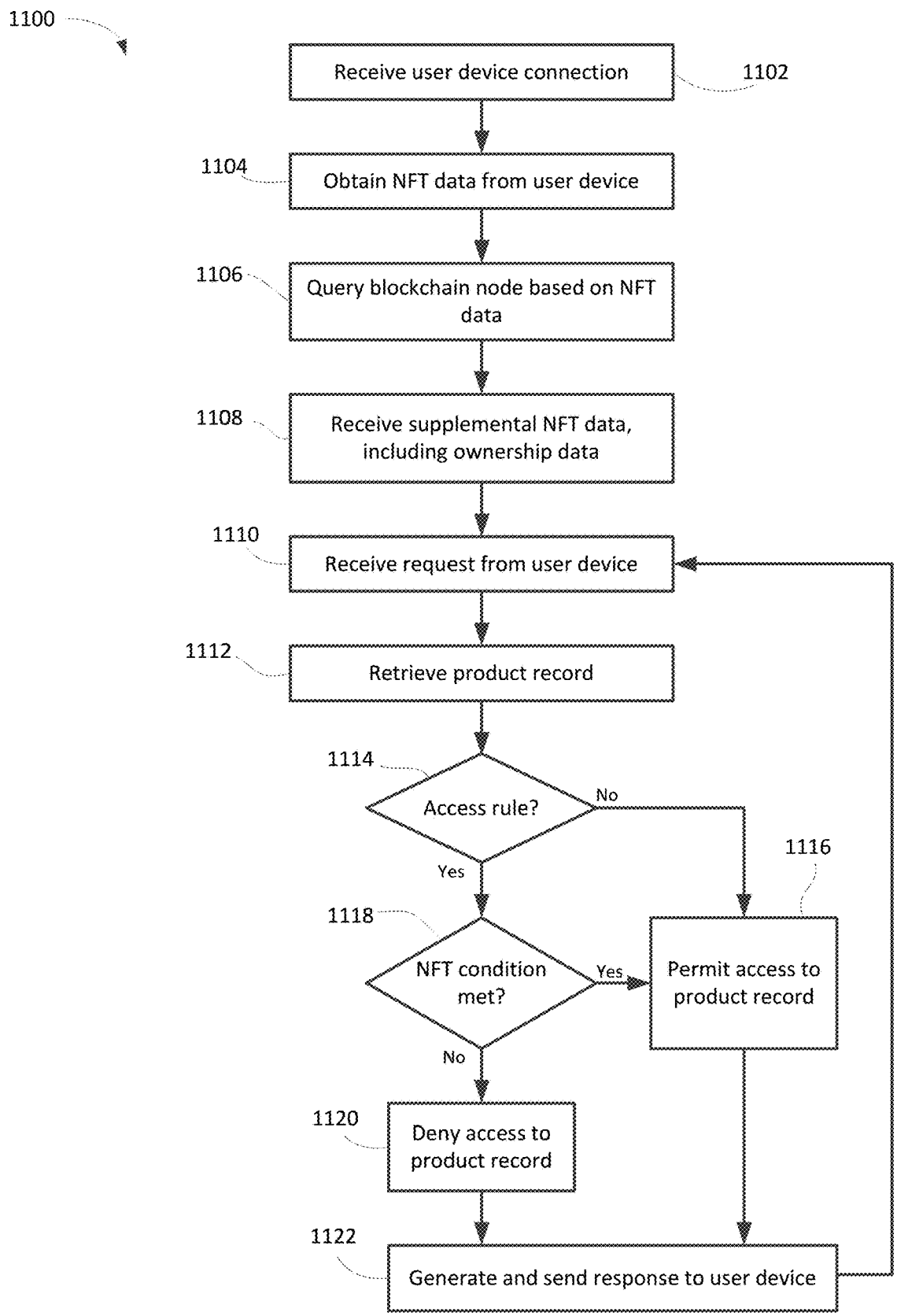
FIG. 11 shows, in flowchart form, yet another example method of automating controlled access to online resources.

Another illustrative example method 1100 is shown in flowchart form in FIG. 11. The method 1100 may be implemented by way of suitably-programmed software instructions stored in memory on a computing device which, when executed by one or more processors of the computing device, cause the computing device to carry out the described operations. The method 1100 may be implemented by a computing system, such as an e-commerce platform in some cases. In some cases, the method 1100 may be implemented by one or more servers forming an e-commerce platform or system, such as the e-commerce system 1004 (FIG. 1).

In operation 1102, a user device establishes a connection with the system. The system may include a web server that receives an HTTP request from a web browser operating on the user device, for example. In another example, the system may operate an app server that receives a connection request, for instance using an API, from a mobile application operating on the user device. The user device and the system may engage in an authentication/login protocol, a handshaking protocol, or the like, as a part of establishing the connection and authenticating the user device. In the case of an e-commerce system, the login to an established user account may be an optional step since non-authenticated devices may be permitted to browse merchant stores on the e-commerce system in a 'guest' mode. In many implementations, the user devices are permitted to select and complete purchases of product items while in guest mode without creating a user account with the e-commerce system.

In operation 1104, the system may obtain NFT data from the user device. The NFT data may be obtained during an initial handshaking or authentication process when the user device establishes a connection to the system in operation 1102, or it may occur later, such as when the user device initiates a product search for particular classes of goods or services, or selects a particular product record for viewing. In this example, the NFT data is obtained from the user device and is validated by the system before the user device engages in browsing available product items from merchants.

The NFT data may be obtained based on a query sent to the user device by the e-commerce system in some implementations. The user device may send the NFT data to the system in response to the query. In some cases, the user device may implement a WalletConnect function through its mobile application or web browser through which it is able to pass NFT data from a wallet application to the system. The NFT data may include, for example, one or more NFT identifiers, one or more wallet identifiers/addresses, one or more smart contract identifiers, NFT attributes associated with one or more NFTs purportedly owned by the user device, ownership history data, or other such data.

In some cases, obtaining the NFT data may further include authenticating the user device's claimed association with one or more wallet addresses or identifiers. In some cases, this may include receiving a cryptographic proof from the user device verifying that the user device has possession of a private key corresponding to a wallet address. This may include obtaining a digital signature from the user device that the system is able to verify was signed using the private key corresponding to the wallet address.

In operation 1106, having obtained NFT data from the user device, the system then queries a blockchain network based on that NFT data. In particular, the system may seek to obtain or validate ownership data with regard to one or more NFTs. The query may specify one or more wallet identifiers or addresses and seek a response that provides data regarding NFTs owned by those wallet addresses. In some cases, the query may specify one or more NFT identifiers and seek ownership data regarding those NFTs, such as current wallet addresses associated with those NFTs, or a history of wallet addresses associated with those NFTs, as owners. The query may be transmitted from the system to a blockchain node that is part of the blockchain network. In some cases, the query may invoke a function or operation of a blockchain smart contract intended for querying ownership data. For example, the system may use the "ownerOf" function defined in the ERC-271 standard for Ethereum-based smart contracts.

In operation 1108, the system obtains supplemental NFT data from the blockchain network. The supplemental NFT data may include ownership data regarding one or more NFTs or wallet addresses that were the subject of the query. The ownership data may enable the system to determine whether the user device, via its associated wallet addresses or identifiers, is the current owner of one or more NFTs, was the past owner of one or more NFTs, and/or the time periods or duration of ownership of one or more NFTs, for instance. If the ownership data from the blockchain conflicts with information provided by the user device the system will rely on the information from the blockchain network in preference to the information from the user device. Based on the NFT data from the user device, and validation of that data or the obtaining of supplemental NFT data from the blockchain, the system then has a record of NFTs owned by wallet addresses/identifiers held by the user device. In some implementations, the record of NFTs may include details regarding each NFT, such as NFT attributes.

The system then receives a request for access to an online resource in operation 1110. It retrieves or accesses that online resource in operation 1112. In this example, the online resource may be a data record for a product item in a merchant catalog of product items, i.e. a product record. In some cases, the request may be in the form of a search query specifying product parameters, keywords, or the like, and the system may identify a set of product records fulfilling the search query. In operation 1114, the system determines whether the product record, or each product record in the case of a set of product records, is subject to an access control rule. In some cases a flag or other indicia in the product record may identify it as subject to access control. In some cases, a separate database or record of product records subject to access control may be maintained by the system and may be searchable by product record identifier or the like. In many cases, the product records are not subject to access control and the system permits access to those records in operation 1116. Accordingly, a response may be generated and sent to the user device in operation 1122. The response may include the product record or data from the product record. In some examples, the response may be a web page configured to display data from the product record, including, for instance, images and information. In some cases, the response includes data from the product record from which the user device may generate a display of product data, such as via a mobile application for browsing the e-commerce system. In some cases, the response may be a web page or other interface containing search results that include at least some of the data from the set of product records that form the search results.

In this manner, the user device may browse the merchant's online store and available product offerings in the normal course, through the receipt of requests from the user device at the system and the transmission of product record data from the system to the user device in response to those requests.

In the case where the system identifies that an access control rule applies to a product record in operation 1114, the system then evaluates whether the condition in the access control rule is met in operation 1118. In some cases, the condition may restrict access to the record based on factors such as browser type, user device type, geographic location, language setting, etc. However, in this example, the access rule condition is based on NFT ownership by the user device. In particular, the condition only permits access to the requested product record if the user device meets the NFT ownership condition. As noted above, the condition may require ownership of one or more NFTs from a particular NFT collection. The condition may require that the owned NFT(s) have one or more specified NFT attributes. The condition may require that the NFT(s) be owned for a minimum period of time or since at least an identified date. The condition may permit past ownership in some cases. In some cases, the condition may be that the user device does not own a particular class or type of NFT.

The NFTs specified in the condition may be associated with the product record in that ownership of the NFTs may indicate an affiliation with or affinity for the product or service with which the product record is associated.

If the condition is satisfied, then access is permitted as shown by operation 1116, and a response is generated and set that is based on or contains data from the restricted-access product record. If the condition is not satisfied, then access is denied as shown in operation 1118. A response is then generated and sent to the user device in operation 1122, but does not include data from the restricted-access product record. In some cases, this may include providing the user device with a web page signalling that access is not permitted. In some cases, the response may provide access to an unrestricted version of the requested product item. In some cases, the response may provide the search results from a user device search query, but excluding product records for which access has been denied from the results.

In this manner, the system gates access to product records based on validated and verified NFT ownership by the requesting user device. In alternative implementation, the access rule may be configured to prevent access based on validated or verified NFT ownership. That is, the access rule may have a condition that the requesting user device not have, e.g. control over one or more NFTs. In this manner, the system may prevent access to product records if a user device holds certain NFTs. This may be applied in the case where a user or user device already holds a certain product or has accessed a particular service, perhaps from a third party, and further purchases of related products or services are blocked. Or the user device may have an NFT demonstrating affiliation or membership with a certain group or institution and the access rules may be configured to prevent access to users having such a membership or affiliation.

All of the above-described examples relate to non-fungible tokens, i.e. NFTs. In some cases, the access control rule may relate to fungible tokens. Fungible tokens are tokens that represent some fungible quantity. A common example is cryptocurrency, where a token may represent a quantity of cryptocurrency. In some cases, a token may represent a quantity of fiat currency, for example if tokens were to be generated in which each token represents a certain quantity of US dollars. In another example, the fungible tokens may represent a quantity of a good or service. In a computing environment, a fungible token could represent entitlement or access to a certain amount of memory in a data storage unit, or processing time on a computing device. In another example, the fungible token could represent ownership or interest in a certain quantity of a commodity, such as barrels of crude oil, kilograms of fertilizer, kWh of power, etc.

An access control rule may, in some cases, be based on a user device having one or more associated fungible tokens. In one simple example, the access control rule may set, as a condition, that the user device be associated (through its one or more wallet addresses) with at least a minimum quantity of a particular cryptocurrency. In some cases, the condition set may be that the fungible tokens be held for a minimum duration of time, or that they have been owned since at least a particular time/date, or that they were previously owned before a certain date. In some cases, the condition set may be that two or more different classes or types of fungible tokens are owned. Other such conditions or combinations of conditions may be applied in other examples.

In yet another example embodiment, the access control rule may set a condition that includes both ownership of a particular NFT, or an NFT having particular attributes, as described above, plus ownership of one or more fungible tokens. Various ancillary conditions may be incorporated into the condition in the access control rule, such as that the specified type of fungible tokens be owned in a particular quantity (e.g. tokens representing at least 50 kWh of power, or tokens representing at least 10 terabytes of data storage, etc.), or with particular ownership history (time since first owned, duration, etc.), or other such restrictions.

In any of the above-described example methods or processes it will be understood that certain operations described as occurring in sequence may be implemented in a different sequence or carried out in parallel without impacting the overall functioning of the method or process.

Differentiated User Interfaces

In some situations, NFT ownership may be used as a proxy for interest or investment in particular industries, sports, or areas of interest. The ownership of such NFTs may serve as a mechanism for determining whether and how to customize interface content for a user device. That is, ownership by a computing device of one or more particular NFTs may be used as the basis for customizing interface content requested by that computing device in order to provide the computing device with interface content altered based on attributes or features of one or more NFTs associated with the device. "Interface content" in these examples may refer to graphical or multi-media content intended for output on an interface of the receiving device. The content may be text, images, layout elements, video, audio, etc. The layout and some or all of the content may be defined by a markup language document in some cases, such as a web page. In some cases, the interface content may be for display through a mobile application other than a web browser.

Customization of the interface content may include making certain alterations or changes if the NFT meets prescribed criteria. In some cases, attributes or features within an image or other media associated with the NFT may be the basis for determining which customization or changes to make to the interface content. In some implementations, an automated analysis of an image or other media associated with the NFT, such as dominant colour analysis or object detection, may be the basis for customizations. In some cases, colour settings or other parameters or attributes within the NFT metadata may be the basis for customizations. For example, some NFTs may have, as attributes, differentiated classes or levels, which may be used as the basis for making differentiated customizations to the interface contents that correspond to the class or level of an NFT owned by the user device. In another example, an NFT may have a background or foreground colour setting and that same colour setting, or a colour setting selected based on the NFT settings, may be used in the interface content to create customized interface content.

It will be appreciated that the "customization" of interface content described herein is not merely incorporating or embedding data, media, or text from the NFT into the interface content. For example, customization of the interface content is not simply displaying an NFT image in a web page, or displaying the NFT metadata on a webpage. Rather, the "customization" is a change to the interface content that is determined based upon the NFT metadata or content, but is not embedding or including the NFT metadata or content. In some cases, it may include changing a user interface element or colour in the interface content based upon the NFT metadata or content, without incorporating the actual NFT metadata or content.

Advantageously, example systems and methods described below enable real-time customization of interface content based on characteristics derived or obtained from NFTs owned by the requesting device. The ownership of the NFTs is independently verifiable through the corresponding blockchain network, thereby ensuring only user devices with verified ownership of the one or more NFTs received the customized interface content. Because the NFTs may reflect activity or user history from outside the server platform that is providing the interface content, the server platform is relieved from the burden of obtaining and tracking that external third party user activity in order to determine whether and how to customize interface content, thereby reducing storage requirements at the platform. Moreover, to the extent that customizations are generated based on a combination of NFT features or attributes, and the universe of possible combinations is extremely large, by basing the customization on a real-time detection of the combination of NFT features or attributes, the platform does not need to pre-generate various versions of the interface content and selection from those pre-generated version; instead, it customizes the interface content after determining NFT features or attributes rather than storing a vast range of possible customizations for combinations of NFT features or attributes that may never be detected.

It will be appreciated that in some cases, only NFTs that have the specified attribute or feature or combination or subset of attributes, may result in customization of the interface content. In some implementations, one or only a few NFTs may have the specified attribute or combination/subset of attributes. In some other cases, many NFTs may have the specified attribute or combination of attributes.

The NFTs are not necessarily issued by (minted) or tracked by the central server or platform providing the interface content; i.e. they may be "unconnected" to the central server insofar as the central server was not involved in their minting or in managing them. The central server is not necessarily a part of the blockchain networks upon which the NFTs are minted and recorded. Nevertheless, the central server is capable of obtaining details regarding the NFTs from user devices and obtaining and/or validating ownership data regarding the NFTs from the blockchain network, thereby customizing interface content on the basis of verified NFT ownership information without the computational and data storage burden of tracking user device history and activity directly, particularly with regard to user device interactions with third party systems.

Figure 12:
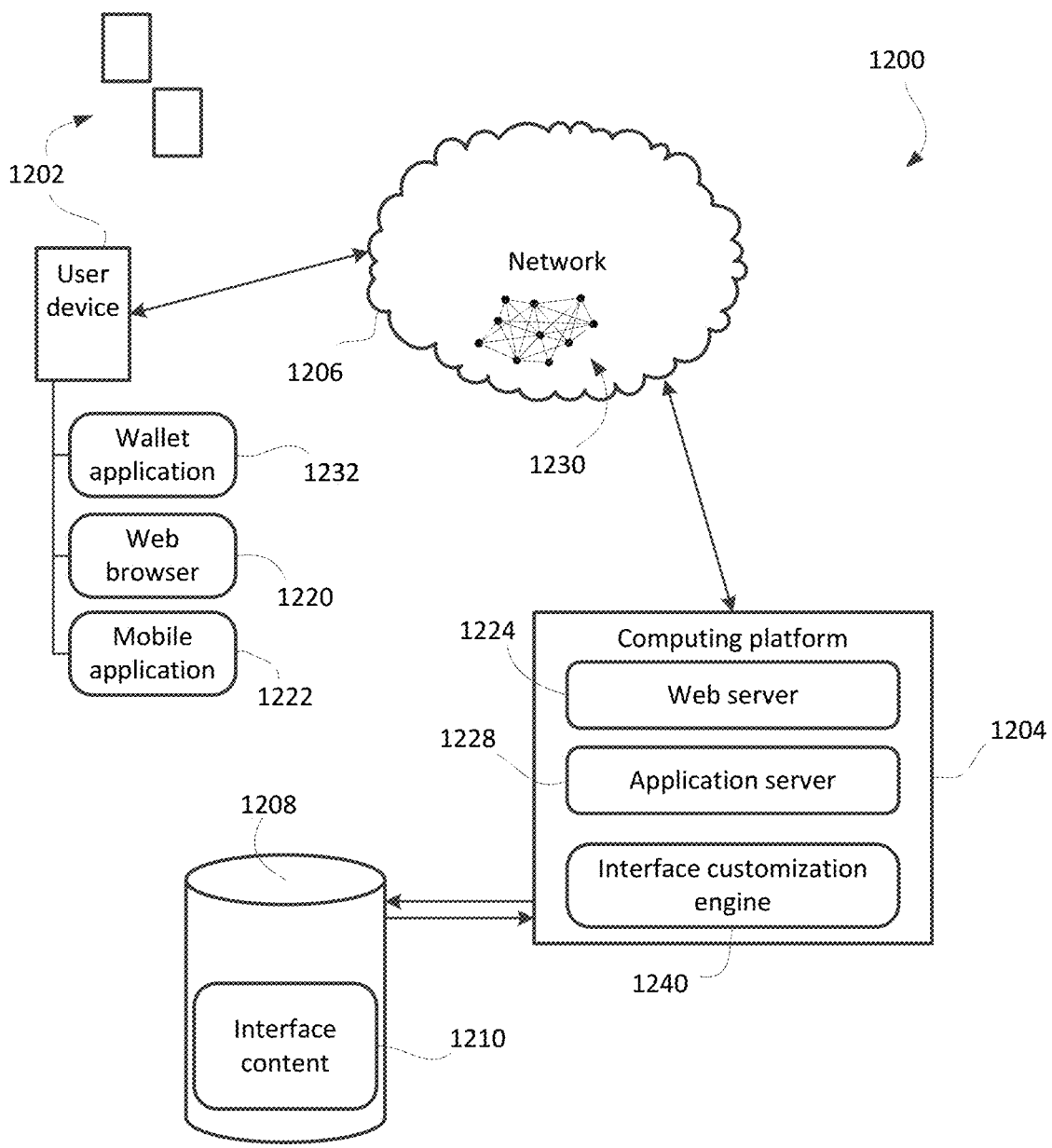
FIG. 12 shows an illustrative simplified example system.

Reference will now be made to FIG. 12, which diagrammatically illustrates a simplified example system 1200 in accordance with an aspect of the present application. In this example, the system 1200 includes a network-connected computing platform 1204, and a plurality of user devices 1202. The user devices 1202 and the computing platform 1204 may communicate over a network 1206. The network 1206 may include interconnected wired and/or wireless networks, including the Internet. The user devices 1202 may include a range of computing devices, such as laptops, desktops, tablets, smartphones, and the like.

The computing platform 1204 may be implemented using one or more servers. The computing platform 1204 may include data storage 1208, which may include one or more databases or other data structures within or accessible to the servers. The data storage 1208 may include interface content 1210. The interface content 1210 may be web pages, mobile app pages, and/or graphical or multi-media elements or resources referenced in the web pages and/or mobile app pages. The interface content 1210 may be defined using markup language, such as hypertext markup language (HTML), extensible markup language (XML), or others. In some cases, the interface content 1210 may be defined using cascading style sheet (CSS). In some implementations, the interface content 1210 may employ Javascript frameworks. Irrespective of the mechanism used to define them or the context in which they are intended to be used (e.g. web browsing, native app, etc.), the interface content 1210 generally defines user interface layout, colours, fonts, behaviour, content, etc.

The user devices 1202 may include a web browser 1220 and/or a mobile application 1222 through which the user device 1202 is able to connect with the computing platform 1204 in order to request and receive content for display or output on the user device 1202. The output may include graphical display on a display screen of the user device 1202. In some cases, the display may include graphical rendering of the page(s), display of images, playback of animations, decoding and display of video content, etc. In some cases, the output may further include output of audio content via a speaker, or other such output.

The web pages, mobile pages, or other content transmitted to the user devices 1202 for display via the web browser 1220 or mobile application 1222 may be obtained from the stored interface content 1210. As a user device 1202 searches or browses pages or content, the computing platform 1204 may retrieve the corresponding interface content 1210 for causing display of that content on the user device 1202.

In some implementations, the computing platform may implement a web server 1224 for receiving and responding to HTTP requests for web pages from the web browser 1220. In some implementations, the computing platform may implement an application server 1228. The application server 1228 may receive and respond to requests from the mobile application 1222. The requests may employ HTTP in some implementations. The application server 1228 may implement REST-compliant APIs in some cases. In general, the web server 1224 and/or application server 1228 are configured to receive and respond to requests from the user devices 1202 for the interface content 1210.

The computing platform 1204 includes an interface customization engine 1040. The interface customization engine 1240, although illustrated separately for ease of discussion, may be implemented within the web server 1224, the application server 1228, or both. In some cases, the computing platform 1204 implements a rendering engine that is configured to load theme data and other content from the interface content 1210 for servicing requests, and returns a response to a user device 1202 that assembles the various data and elements from the interface content 1210 in accordance with a selected theme in order to provide the user device 1202 with a page for display. In the example case of a multi-tenant e-commerce platform, each merchant may have a large set of product data, images, and other information, together with merchant-defined themes and imagery that is collectively used to configure the merchant's storefront. The theme renderer responds to a user device request by selecting the requested product data and assembling and sending a page in accordance with the merchant's defined theme and other merchant-configured parameters.

In this example, the network 1206 further includes a blockchain network 1230. The blockchain network 1230 may operate in accordance with a blockchain protocol, such as Bitcoin or Ethereum, as examples. The user device 1202 may include a wallet application 1232, which is a blockchain application on the user device 1202 that may store blockchain-related data. In some cases, the wallet application 1232 may securely store public and private key pairs associated with the user device 1202. The public keys may be shared and made publicly available for the purpose of receiving blockchain-based data transfers of fungible or non-fungible tokens. The private keys may be stored securely and confidentially and may be used by the wallet application 1232 in certain signature operations for providing digital signatures that prove ownership of corresponding public keys, among other things. The wallet application 1232 may be referred to as a simplified payment verification (SPV) client in some implementations.

The wallet application 1232, in this example, includes NFT data with regard to one or more NFTs associated with the user device 1202. The NFT data may include, in some cases, an NFT identifier, a public key associated with the wallet (e.g. a wallet identifier), a transaction identifier associated with ownership of the NFT, an NFT collection identifier, a smart contract identifier, or other such data regarding the NFT and/or its ownership by the user device 1202. In some cases, the NFT data may include additional data regarding the NFT itself, such as associated media (e.g. image or video), attributes, or a textual description.

In some implementations, the wallet application 1232 may be configured to provide NFT data to the computing platform 1204. For example, the wallet application 1232 may use the open-source WalletConnect protocol to connect and interact with decentralized applications (dApps). Other protocols may be used in other implementations. In some cases, the connect protocol may be used to connect the wallet application 1232 to the mobile application 1222. In some cases the connect protocol may be used to connect the wallet application 1232 to the web browser 1220. In short, the wallet application 1232 is configured such that it is able to securely provide NFT data to the computing platform 1204 and, in particular, the interface customization engine 1240, regarding NFTs purportedly owned by the user device 1202, and/or to authenticate the user device's 1202 ownership of certain public keys associated with particular NFTs recorded on the blockchain network 1230.

The interface customization engine 1240 may then customize the web page or app page provided to the user device 1202 based on the NFT data. In this regard, based on the NFT data or an analysis of the NFT data performed by the interface customization engine 1240, one or more visual elements of the requested interface content 1210 may be altered by the interface customization engine 1240. As noted above, in some cases, this may include changing a colour parameter, a theme setting, adding a graphical or multimedia element to the page, or other such customizations.

In one implementation, the possible customizations are pre-defined in the interface content 1210. That is, the developer of the interface content 1210 may pre-designate certain elements, settings, or parameters that are "customizable". In other words, they may be implemented in the defined content using a tag or other marker in the markup language that signals that the element may be altered if the computing platform 1204 determines that customization is to be performed.

In some cases, the developer of the interface content 1210 may provide a set of possible customizations. That is, the interface content 1210 may provide a base content that is available to the user devices 1202 and then provide certain defined possible customizations that the computing platform 1204 may implement if the interface customization engine 1240 determines that customization is to be performed on a page. As an example, the interface content 1210 may provide set of available background colours or images for a page, one of which is the base colour used by default and the others which are available for selection by the interface customization engine 1240 based on the NFT data associated with a specific one of the user devices 1202.

In some other cases, the interface content 1210 may not define any constraints on customization and the interface customization engine 1240 may implement any customization operation that it determines should apply to a page based on the NFT data associated with a specific one of the user devices 1202.

The computing platform 1204 and/or the user devices 1202 may be implemented using one or more computing devices, such as those described in FIG. 2.

Figure 13:
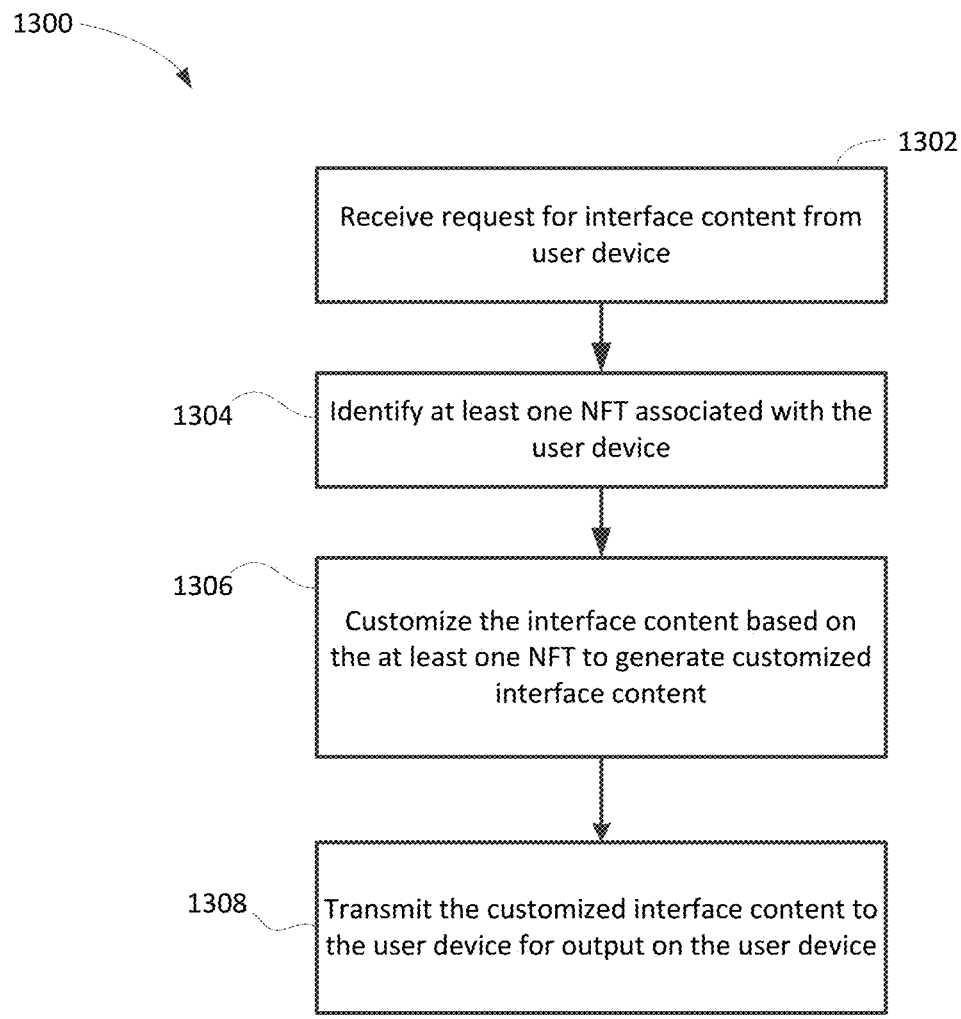
FIG. 13 shows, flowchart form, one example method of customizing interface content based on non-fungible token ownership.

Reference will now be made to FIG. 13, which shows, in flowchart form, one example method 1300 of customizing interface content so as to provide for differentiated user interfaces. The method 1300 may be implemented by the computing platform 1204 (FIG. 12) in some cases and, in particular, by the interface customization engine 1240 (FIG. 12). In particular, the method 1300 may be implemented by way of suitably-programmed software instructions stored in memory on a computing device which, when executed by one or more processors of the computing device, cause the computing device to carry out the described operations. In some cases, the method 1300 may be implemented by one or more servers forming an e-commerce platform or system.

In operation 1302, the system receives a request for access to interface content from a user device. The interface content may be a product page or product record that forms part of a merchant's online storefront, in one example implementation. The request may be an HTTP request in some instances. The request may come from a web browser operating on the user device in some cases, and may come from a mobile application operating on the user device in some cases. In an e-commerce implementation, the request may be part of a search query from the user device for product items matching search parameters, such that the product records or details from the product records may form part of a page displaying the search results provided to the user device in response to the query.

In operation 1304, the system determines that the user device is associated with at least one NFT. The system may obtain NFT data from the user device in operation 1304. This may occur earlier in the method 1300 in some cases, such as during an initial login, handshaking, or other authentication process at which time the user device provides NFT data to the system. In some implementations, a WalletConnect operation is implemented at the user device to pass wallet information from the user device to the system, such as data regarding NFTs purportedly owned by the wallet. The NFT data may include one or more NFT identifiers, one or more wallet addresses or wallet identifiers, one or more smart contract identifiers, NFT attribute information, and/or other such data.

The system may query the blockchain network based on the NFT data to obtain or verify ownership data regarding one or more of the NFTs. In particular, the system may identify one or more NFTs from the NFT data as the basis for a possible customization of interface content and may then query the blockchain to determine the current (or past) ownership of those one or more NFTs so as to validate that they are (or were) owned by the user device, e.g. that the recorded blockchain ownership data matches the wallet identifier(s). The query may, in some implementations, rely on a smart contract operation for obtaining current ownership data. The query may be a query message set to a blockchain node that is part of the blockchain network, and a response may be received that provides ownership data for any NFT identifiers included in the query message. In some cases, the query may provide one or more wallet identifiers, and the response message may include NFT identifiers owned by those wallet identifiers and/or a history of NFT ownership for those wallet identifiers.

The data received from the blockchain network may be used to assess whether particular NFTs are owned, or were owned, by one or more wallet addresses or wallet identifiers associated with the user device. Control over a wallet address or wallet identifier by the user device may be verified through obtaining a digital signature (e.g. a cryptographic signing of a message) from the user device using the private key associated with the wallet address. By validating user device control over the wallet identifiers/addresses and by obtaining verified data from the blockchain network confirming ownership information, the system is able to independently validate that the NFTs purportedly held by the user device are in fact owned (or were owned, if past ownership is relevant, or have been owned for a least a minimum duration) by the user device. It will be appreciated that a user may have ownership or control over various NFTs that are recorded on-chain as being owned by a particular wallet address or identifier, and that ownership is demonstrated by the user through the user device by generating and providing a digital signature using a private key that corresponds to the wallet address or identifier. The private key may be stored in a secure area of the user device or may be stored in cold storage or on an external device and may be input to the user device, manually or using a secure input mechanism, in some implementations.

In operation 1306, the system customizes the interface content based on the at least one or more NFTs to generate customized interface content. In this context "customizing" means altering one or more interface elements, wherein the alteration is based on one or more NFT attributes; but it does not include incorporating or embedding NFT media or NFT metadata into the interface content. That is, the customization is not merely displaying an image associated with the NFT as part of the interface content.

The customized interface content is then transmitted to the user device in operation 1308 in response to the request received in operation 1302.

Figure 15:
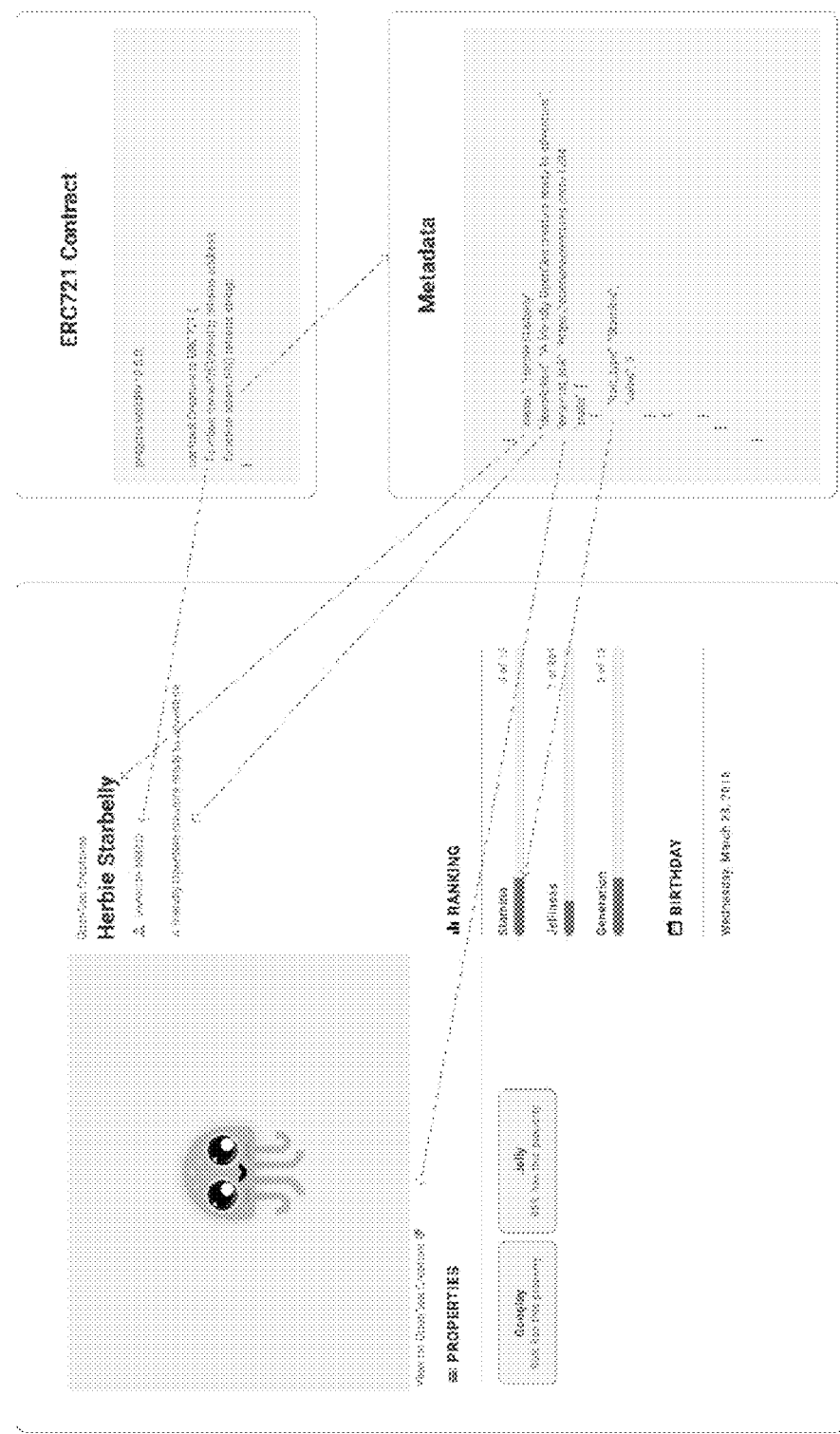
FIG. 15 illustrates an example of non-fungible token metadata and attributes.

FIG. 15 illustrates an example NFT. The example NFT in this case is part of an NFT collection titled OpenSea Creature, which consists of digitally-generated images of cartoonish sea creatures. In this example, the NFT includes an image of the sea creature, where the image is generated to reflect some pseudo-randomly selected NFT attributes of the creature. Example attributes include a base value for the type of creature, attributes specifying the creatures' visible features such as eyes and mouth, and a "level" attribute that may signal a class or ranking of the creature as compared to other creatures in the collection. The NFT metadata may specify these attributes along with other features, settings, or parameters of the NFT. The attributes may be specified in the metadata associated with the NFT such as:

```
...
{
  "attributes": [
    {
      "trait_type": "Base",
      "value": "Starfish"
    },
    {
      "trait_type": "Eyes",
      "value": "Big"
    },
    {
      "trait_type": "Mouth",
      "value": "Surprised"
    },
    {
      "trait_type": "Level",
      "value": 5
    },
```

The image associated with the NFT may have background colours, dominant colours, or sub-dominant colours that are specified in the image file or detectable based on analysis of the image. In some cases, a dominant colour analysis may be applied to determine the dominant colour(s) of an image and their relative dominance. In some cases, the NFT metadata, such as the NFT attributes, may specify one or more colour parameters. In some cases a media file associated with an NFT may include metadata that identifies one or more colours associated with the file. Colours may be specified by hex values, RGB values, CMYK values, etc. The colour(s) may be based on a predetermined taxonomy of colours, such as Pantone™ colours, the RGB colour space, the CYGK colour space, or others.

In some cases, object detection may be used to detect an object in an image. In the case of the example in FIG. 15, such detection is not required since the NFT attributes specify the object, e.g. Starfish; however, in some cases an NFT may include an image or video for which the NFT does not include an object attribute specifying the nature of the object in the image. In such a case, object detection may be used to determine what object is depicted in the media associated with the NFT.

In some implementations, only certain types or classes of NFT may be used as the basis for customization operations by the computing platform. When a user device connects to the computing platform and provides NFT data, the computing platform may identify whether the user device has one or more NFTs that trigger possible customization. The types or classes of NFTs that result in customization may be set by an administrator in some cases. In the case of an e-commerce platform, individual merchants may designate certain NFTs, certain NFT collections, certain NFT attributes, or combinations thereof, that trigger customization.

Figure 14:
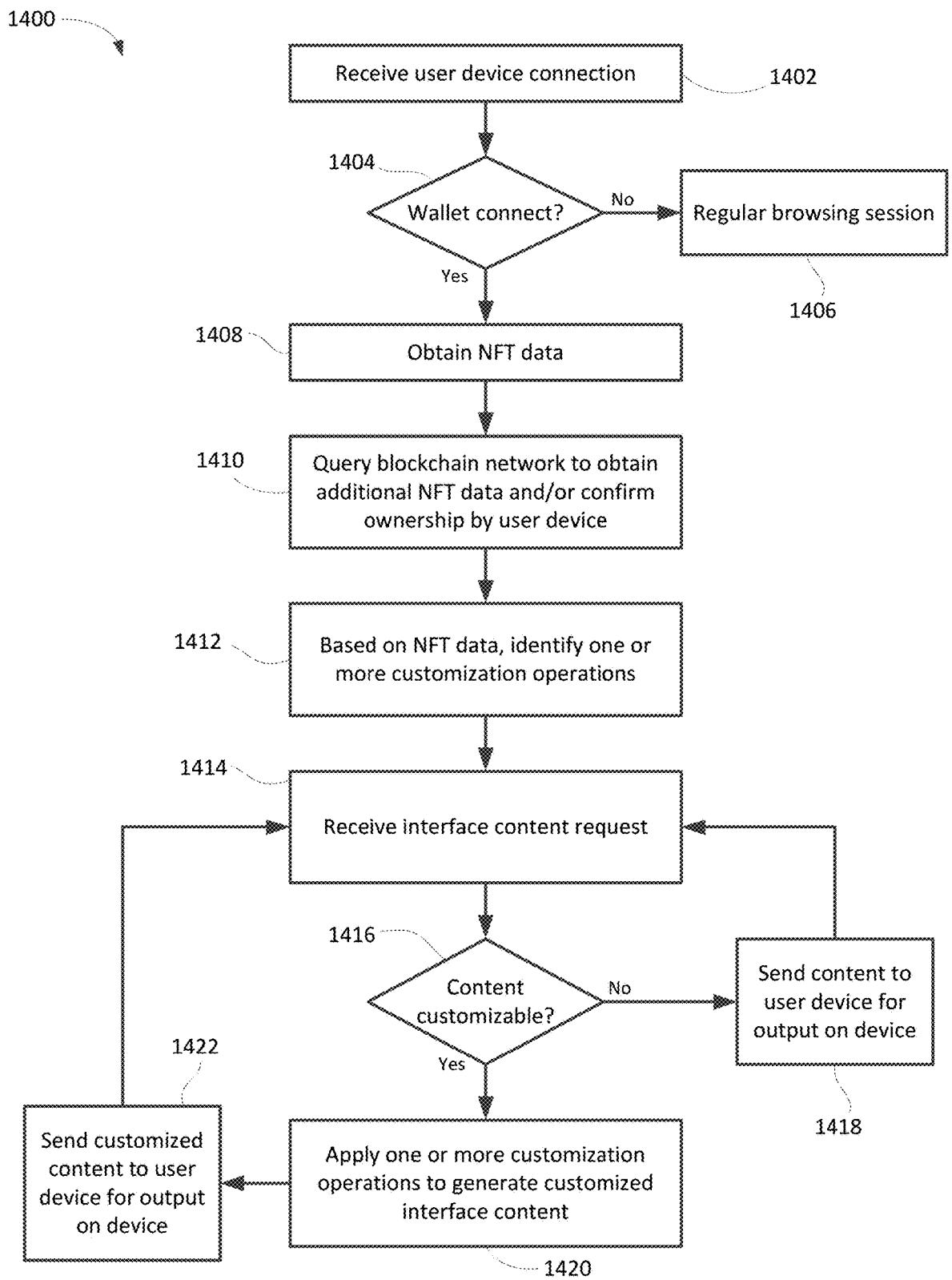
FIG. 14 shows, in flowchart form, another example method of customizing interface content based on non-fungible token ownership.

Another illustrative example method 1400 is shown in flowchart form in FIG. 14. The method 1400 may be implemented by way of suitably-programmed software instructions stored in memory on a computing device which, when executed by one or more processors of the computing device, cause the computing device to carry out the described operations. The method 1400 may be implemented by a computing system, such as the computing platform 1204 (FIG. 12) in some cases. In some cases, the method 1400 may be implemented by one or more servers forming an e-commerce platform or system.

In operation 1402, a user device establishes a connection with the system. The system may include a web server that receives an HTTP request from a web browser operating on the user device, for example. In another example, the system may operate an app server that receives a connection request, for instance using an API, from a mobile application operating on the user device. The user device and the system may engage in an authentication/login protocol, a handshaking protocol, or the like, as a part of establishing the connection and authenticating the user device. In the case of an e-commerce system, the login to an established user account may be an optional step since non-authenticated devices may be permitted to browse merchant stores on the e-commerce system in a 'guest' mode. In many implementations, the user devices are permitted to select and complete purchases of product items while in guest mode without creating a user account with the e-commerce system.

In operation 1404, the system may determine whether the user device is configured to provide NFT data. This may occur through a wallet connect operation in some cases. Many user devices may not hold or may not provide NFT data and, if so, browsing of interface content may be handled as per normally with no NFT-based customization, as indicated by operation 1406.

If NFT data is available from the user device, then in operation 1408 the system obtains NFT data from the user device. In this example, the NFT data is obtained from the user device and is validated by the system before the user device engages in browsing available interface content.

The NFT data may be obtained based on a query sent to the user device by the e-commerce system in some implementations. The user device may send the NFT data to the system in response to the query. In some cases, the user device may implement a WalletConnect function through its mobile application or web browser through which it is able to pass NFT data from a wallet application to the system. The NFT data may include, for example, one or more NFT identifiers, one or more wallet identifiers/addresses, one or more smart contract identifiers, NFT attributes associated with one or more NFTs purportedly owned by the user device, ownership history data, or other such data.

In some cases, obtaining the NFT data may further include authenticating the user device's claimed association with one or more wallet addresses or identifiers. In some cases, this may include receiving a cryptographic proof from the user device verifying that the user device has possession of a private key corresponding to a wallet address. This may include obtaining a digital signature from the user device that the system is able to verify was signed using the private key corresponding to the wallet address.

In operation 1410, having obtained NFT data from the user device, the system then queries a blockchain network based on that NFT data. In particular, the system may seek to obtain or validate ownership data with regard to one or more NFTs. The query may specify one or more wallet identifiers or addresses and seek a response that provides data regarding NFTs owned by those wallet addresses. In some cases, the query may specify one or more NFT identifiers and seek ownership data regarding those NFTs, such as current wallet addresses associated with those NFTs, or a history of wallet addresses associated with those NFTs, as owners. The query may be transmitted from the system to a blockchain node that is part of the blockchain network. In some cases, the query may invoke a function or operation of a blockchain smart contract intended for querying ownership data. For example, the system may use the "ownerOf" function defined in the ERC-271 standard for Ethereum-based smart contracts.

In response to the query, the system obtains supplemental NFT data from the blockchain network. The supplemental NFT data may include ownership data regarding one or more NFTs or wallet addresses that were the subject of the query. The ownership data may enable the system to determine whether the user device, via its associated wallet addresses or identifiers, is the current owner of one or more NFTs, was the past owner of one or more NFTs, and/or the time periods or duration of ownership of one or more NFTs, for instance. If the ownership data from the blockchain conflicts with information provided by the user device the system will rely on the information from the blockchain network in preference to the information from the user device. Based on the NFT data from the user device, and validation of that data or the obtaining of supplemental NFT data from the blockchain, the system then has a record of NFTs owned by wallet addresses/identifiers held by the user device. In some implementations, the record of NFTs may include details regarding each NFT, such as NFT attributes.

In operation 1412, the system may determine, based on the NFT data, e.g. the NFT metadata, attributes, or associated media, whether one or more of the NFTs owned by the user device trigger customization of interface content and, if so, what customization operation or customized elements may be included. In some cases, the determination of whether to customize interface content is based on whether the NFTs include one or more NFTs from a specified collection, one or more NFTs having a particular combination or subset of attributes, one or more NFTs of a certain class or "level", or other such criteria or combinations of such criteria.

The system then receives a request for access to interface content in operation 1414. The system determines, in operation 1416, whether the requested interface content is to be customized. In some cases, only particular portions of the interface content are designated as being customizable. If the response to the request does not include a customizable portion of the interface content then no customization may be performed with regard to the interface content included in response to the current request. In operation 1418, a response that includes non-customized interface content is transmitted to the user device. The response may be an XML or other formatted document and associated media elements or files. The response may be a web page in HTML or another markup language. The response may be dynamically assembled by a rendering engine from interface content in some cases.

In some implementations, an interface may have multiple customizable portions and different NFTs may enable customization of different portions and/or different subsets of the customizable portions. For instance, one or more NFTs that are more commonplace may only product modification of a smaller subset of customizable portions than rarer or more exclusive NFTs.

If, in operation 1416, the system determines that at least a part of the interface content is customizable, then it applies one or more customization operations in operation 1420 so as to generate customized interface content. In operation 1422, the customized interface content is sent to the user device in response to the request.

The customization operations may be constrained by preselected operations defined within the customizable interface content. For example, a web page may be configured to permit changing of the background colour or a background image. A customization operation in that case may include selecting a different background colour or background image based on the NFT metadata. Certain customized content may have been identified in operation 1412, where for example a colour, or object, etc., is identified based on the NFT metadata.

In some cases, the interface content does not constrain or pre-identify what elements are customizable or how they are customizable. Instead, the interface customization engine determines which elements, if any, are to be customized and how they are to be customized. The engine may have a preset number of customization options and operations and may identify one or more of those operations and the applicable content based on an analysis of the NFTs. For instance, if the user device has an NFT from a certain collection that is at least above a certain "level" or "class", the customization operations may be targeted at displaying embellished graphical elements, such as changing a colour within the theme to another colour, such as "gold" or "silver", or through adding graphical elements, etc. If the NFT is from a certain collection, such as NBA™ TopShots associated with a particular sport, like basketball, the customization operations may be to incorporate basketball-related graphical elements, for example. In another example, the NFT may be a receipt or proof of involvement in a specific activity, such as an event or club. The customization operation may be incorporation of a graphical element related to that specific activity or event. In some cases, the customization operation may include reordering the position of certain user interface elements or sections, or changes to the spacing or border characteristics of certain user interface elements, for example.

In this manner, the computing system is able to customize interface content so as to provide differentiated user interfaces to different user devices, where the customization applied is based on one or more NFTs owned by those respective user devices.

Figure 16A:
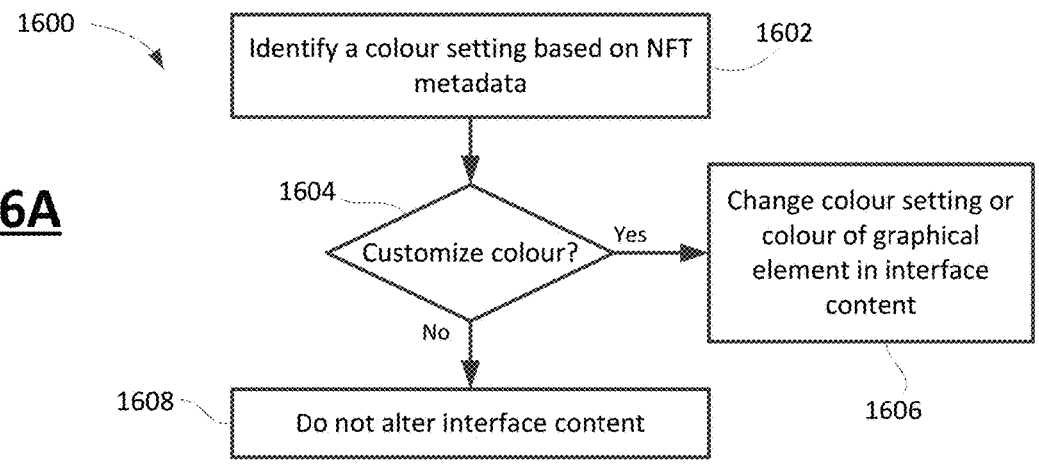
FIGS. 16A-16C show flowcharts illustrating example methods for customizing interface content.

Reference is now made to FIG. 16A, which shows a first method 1600 of customizing interface content. The first method 1600 is customization of a colour setting. In operation 1602, the system identified a colour customization based on the NFT metadata. The determination of a colour customization may be based on an NFT attribute or parameter that specifies a colour value in some cases. In some cases, the colour customization may be based on an NFT attribute, but not one that specifies a colour. For instance, the NFT attribute may indicate that the class or level of the NFT is a highest or premium class. On that basis, a colour associated with a highest or premium class level (e.g. gold, platinum, etc.) may be identified. In yet another example, the determination of a colour customization may be based on colour analysis of one or more media files associated with the NFT. For instance the NFT may be associated with digital art or an image and the system may conduct image analysis to identify one or more dominant colours of an object in the image, or to identify a background colour of the image.

In operation 1604, the system determines whether the interface content colour is to be changed. This may be based on whether the specific request from the user device is for interface content that may be customized or not. In some cases, only certain portions of the interface content include customizable colours. If not, then no alteration is made, as indicated by operation 1608. If the colour can be changed, then in operation 1606 the system changes at least one colour setting in the interface content. This may include changing a theme setting, colour parameter in a markup language document, or other alterations that impact at least one colour on the rendered page. The selected or new colour may be one identified based on the NFT metadata, e.g. through dominant colour analysis, or may be selected from among a set of predefined possible colours for use in the interface, where the selection is made based on the NFT metadata.

Some of the colour customization operations may include changing a colour of a scroll bar, a header field, UI buttons, etc.

In some cases, the determination of colour customization is based on two or more NFTs. That is, the system may identify one or more colours based on the NFT data for two or more NFTs owned by the user device and may then customize the interface content based on those one or more colours.

Figure 16B:
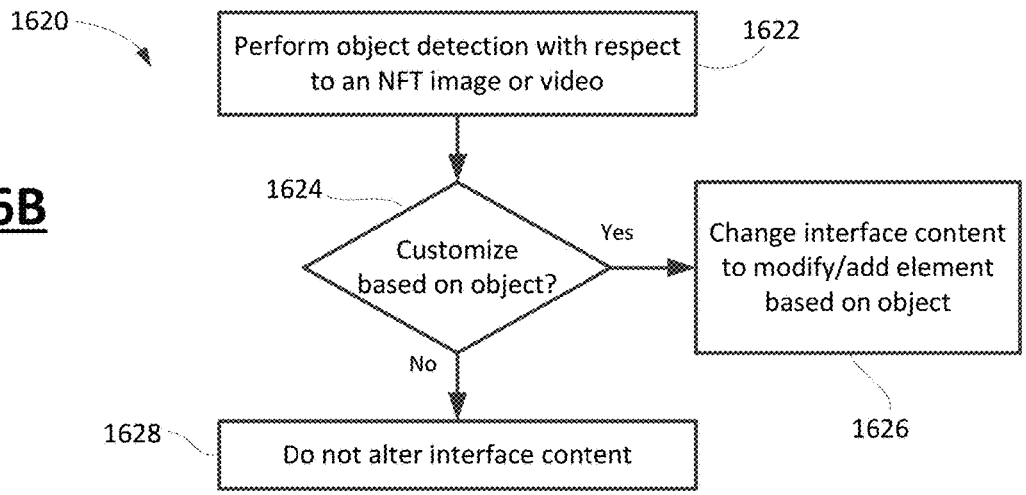

FIG. 16B shows a second method 1620 in which the customization applied is based on an object detected or associated with the NFT. In operation 1622, the system performs object detection with respect to at least one image associated with the NFT. The NFT may relate to digital art, in which case it has an associated digital image representing that art. In some cases, the NFT may relate to a digital photograph or video. The system may determine, using object detection, a subject of the image, such as a certain class of animal, household object, sport, or other topic.

In operation 1624, the system determines whether the interface content may be customized on the basis of a detected object. This may be based on whether the specific request from the user device is for interface content that may be customized or not, or that may be customized on the basis of a detected object, or the specific object that was detected. In some cases, only certain portions of the interface content are customizable based on objects or certain objects. If not, then no alteration is made, as indicated by operation 1628.

If the content can be changed on the basis of a detected object, then in operation 1626 the system changes at least one element of the interface content. This may include changing a theme setting, embedded image or video, or other alterations that impact at least one graphical element on the rendered page based on the detected object. In some cases, this may include incorporating at least one graphical element that is associated with or suggestive of the detected object into the rendered page.

Figure 16C:
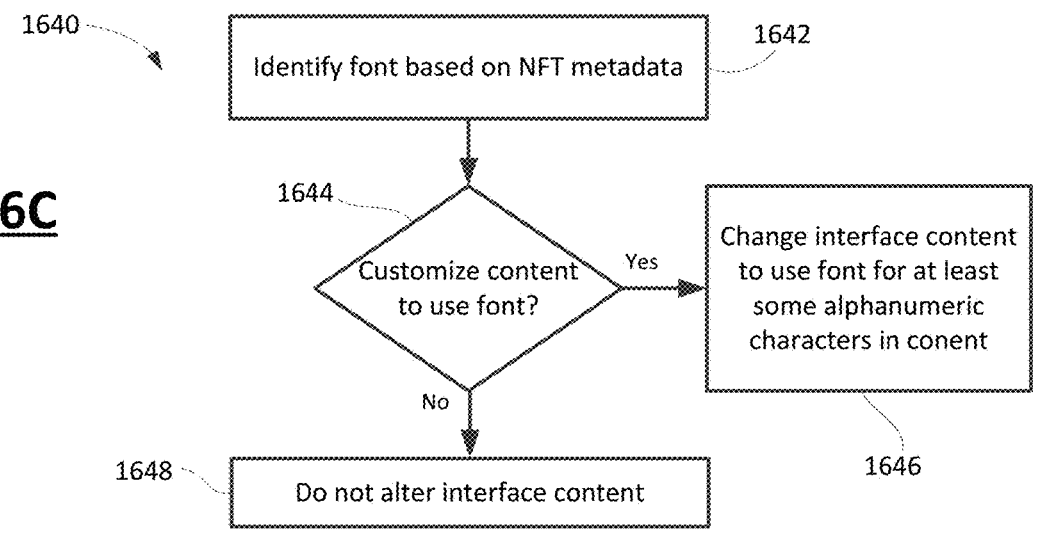

FIG. 16C shows a third method 1640 of customizing interface content for a user device. In operation 1642 the system identifies a font associated with the NFT. In some cases, the NFT may include, as an attribute or elsewhere in its metadata, a specified font. In some cases, the NFT may include a URL or other identifier for a font package available for download from a third party server. The font package may be a font containing custom glyphs for use by the owner of the NFT. The font may be a single glyph for replacement in an otherwise-standard font package, such as a custom rendering of a particular letter, in some cases. The font may be a full set of glyphs for a complete font package in some cases.

In operation 1644, the system may determine whether the interface content includes text content that may be altered to use the custom font associated with the NFT. If not, then it makes no alterations and uses the default font (if any) in rendering and sending the interface content to the user device, as indicated by operation 1648. If the interface content can be modified to use the font associated with the NFT, then the system alters the interface content to use at least one glyph from the custom font associated with the NFT in operation 1646. In this manner, the interface content is customized to use the custom font instead of a default or prescribed font for at least some alphanumeric characters rendered from the interface content and transmitted to the user device. The user device is thus provided with a differentiated user interface that employs a custom font that is only available as a result of the user device's association with the NFT that identifies or provides that custom font.

In any of the above-described example methods or processes it will be understood that certain operations described as occurring in sequence may be implemented in a different sequence or carried out in parallel without impacting the overall functioning of the method or process.

Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 8:
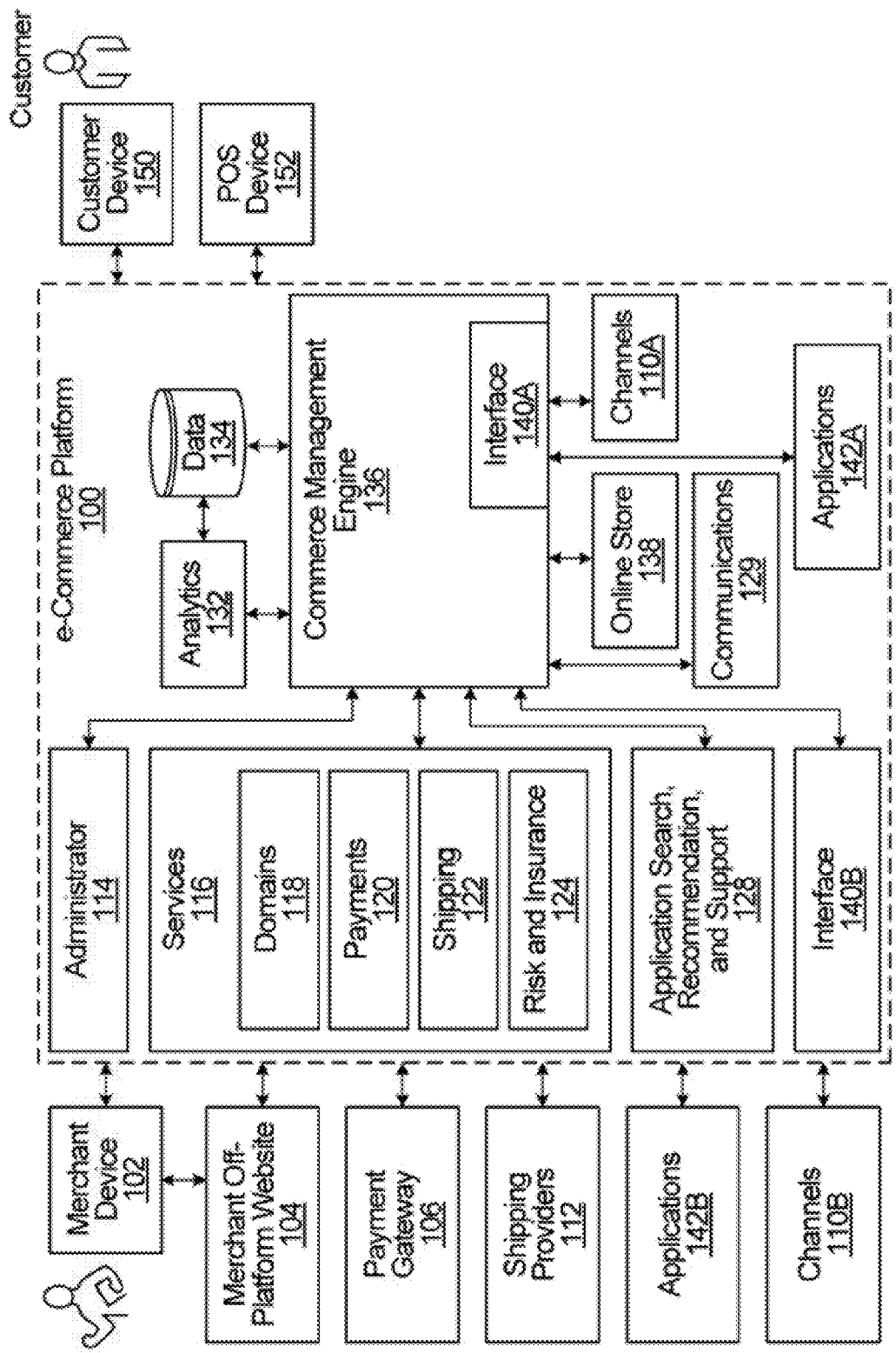
FIG. 8 is a block diagram of an e-commerce platform, in accordance with an example embodiment.

FIG. 8 illustrates an example e-commerce platform 100, according to one embodiment. The e-commerce platform 100 may be exemplary of the e-commerce platform 1004 described with reference to FIG. 1. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 8, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point-of-sale (POS) devices 152 in physical locations (e.g., a physical storefront or other location such as through a kiosk, terminal, reader, printer, 3D printer, and the like). The example computing device 200 of FIG. 1 may be exemplary of each POS device 152.

A merchant may utilize the e-commerce platform 100 as a sole commerce presence with customers, or in conjunction with other merchant commerce facilities, such as through a physical store (e.g., "brick-and-mortar" retail stores), a merchant off-platform website 104 (e.g., a commerce Internet website or other internet or web property or asset supported by or on behalf of the merchant separately from the e-commerce platform 100), an application 142B, and the like. However, even these "other" merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through "buy buttons" that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point-of-sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment facility 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 9:
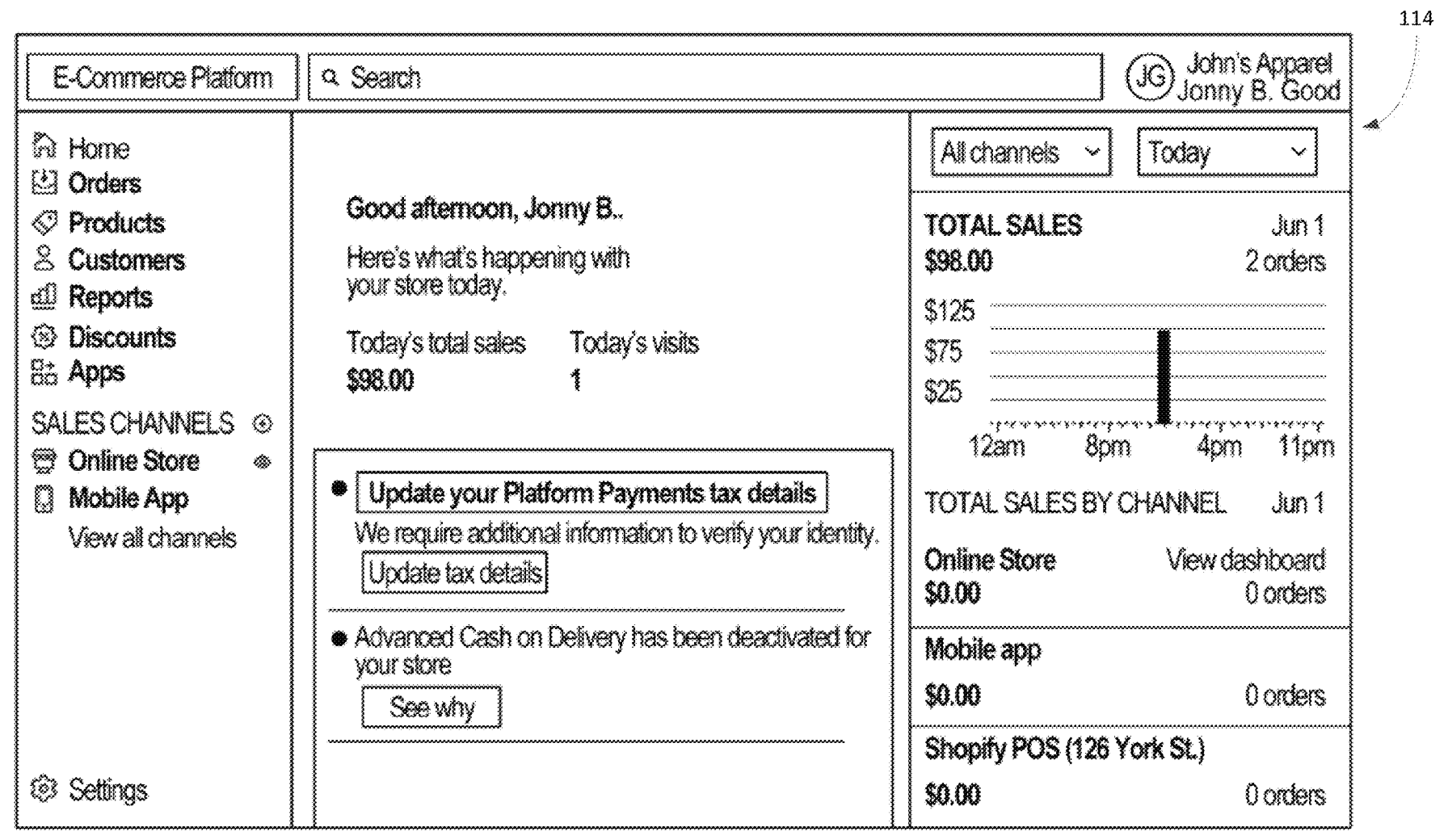

FIG. 9 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 9. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 8, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
receiving, at a server, a designation of a non-fungible token collection in connection with a merchant account, each non-fungible token in the non-fungible token collection having a respective combination of non-fungible token attributes;
detecting an association between one or more product records and a combination of two or more of the non-fungible token attributes;
automatically generating an access rule with regard to the one or more product records, wherein the access rule is conditional on ownership of one of the non-fungible tokens of the non-fungible token collection that has the combination of the two or more of the non-fungible token attributes; and
applying the access rule to provide a user device with access to the one or more product records based on verification of the ownership of the one of the non-fungible tokens by the user device, wherein the verification of the ownership of the one of the non-fungible tokens by the user device includes:
receiving, from the user device, at least an NFT identifier;
querying a blockchain regarding the NFT identifier;
receiving, from the blockchain, non-fungible token data associated with the NFT identifier including ownership data that includes a wallet identifier; and
verifying that the wallet identifier in the ownership data matches a user device wallet identifier.

2. The computer-implemented method of claim 1, wherein detecting the association includes:
detecting a newly-minted token in the non-fungible token collection, the newly-minted token having a set of attributes that includes the combination of the two or more of the non-fungible token attributes; and
detecting a correlation between the combination of the two or more of the non-fungible token attributes and the one or more product records.

3. The computer-implemented method of claim 2, wherein the one or more product records include product attributes, and wherein the correlation is based on matching between the product attributes and the combination of two or more of the non-fungible token attributes.

4. The computer-implemented method of claim 3, wherein the correlation has an associated correlation metric, and wherein automatically generating is based on determining that the correlation metric exceeds a minimum confidence threshold.

5. The computer-implemented method of claim 1, wherein verifying that the wallet identifier in the ownership data matches the user device identifier includes validating a cryptographic signature from the user device using the wallet identifier.

6. The computer-implemented method of claim 1, wherein the non-fungible token data further includes the combination of two or more of the non-fungible token attributes.

7. The computer-implemented method of claim 1, wherein the one or more product records relate to at least one of a discount on a product item or a limited-edition product item.

8. The computer-implemented method of claim 1, wherein applying the access rule to provide a user device with access to the one or more product records includes providing the user device with a restricted product record for a requested product item when ownership of the one of the non-fungible tokens by the user device is verified and providing the user device with an unrestricted product record for the requested product item when ownership of the one of the non-fungible tokens by the user device cannot be verified.

9. A computing system, comprising:
one or more processing units;
one or more data storage units; and
memory storing processor-executable instructions that, when executed by the one or more processing units, are to cause the processing units to:
receive a designation of a non-fungible token collection in connection with a merchant account, each non-fungible token in the non-fungible token collection having a respective combination of non-fungible token attributes;
detect an association between one or more product records and a combination of two or more of the non-fungible token attributes;
automatically generate an access rule with regard to the one or more product records, wherein the access rule is conditional on ownership of one of the non-fungible tokens of the non-fungible token collection that has the combination of the two or more of the non-fungible token attributes; and
apply the access rule to provide a user device with access to the one or more product records based on verification of the ownership of the one of the non-fungible tokens by the user device, wherein the verification of the ownership of the one of the non-fungible tokens by the user device includes:
receiving, from the user device, at least an NFT identifier;
querying a blockchain regarding the NFT identifier;
receiving, from the blockchain, non-fungible token data associated with the NFT identifier including ownership data that includes a wallet identifier; and
verifying that the wallet identifier in the ownership data matches a user device wallet identifier.

10. The computing system of claim 9, wherein the instructions, when executed, are to cause the processing units to detect the association by:
detecting a newly-minted token in the non-fungible token collection, the newly-minted token having a set of attributes that includes the combination of the two or more of the non-fungible token attributes; and
detecting a correlation between the combination of the two or more of the non-fungible token attributes and the one or more product records.

11. The computing system of claim 10, wherein the one or more product records include product attributes, and wherein the correlation is based on matching between the product attributes and the combination of two or more of the non-fungible token attributes.

12. The computing system of claim 11, wherein the correlation has an associated correlation metric, and wherein the instructions, when executed, are to cause the processing units to automatically generate the access rule based on determining that the correlation metric exceeds a minimum confidence threshold.

13. A non-transitory, computer-readable medium storing computer-executable instructions that, when executed by one or more processors, are to cause the one or more processors to:
receive a designation of a non-fungible token collection in connection with a merchant account, each non-fungible token in the non-fungible token collection having a respective combination of non-fungible token attributes;
detect an association between one or more product records and a combination of two or more of the non-fungible token attributes;
automatically generate an access rule with regard to the one or more product records, wherein the access rule is conditional on ownership of one of the non-fungible tokens of the non-fungible token collection that has the combination of the two or more of the non-fungible token attributes; and
apply the access rule to provide a user device with access to the one or more product records based on verification of the ownership of the one of the non-fungible tokens by the user device, wherein the verification of the ownership of the one of the non-fungible tokens by the user device includes:
receiving, from the user device, at least an NFT identifier;
querying a blockchain regarding the NFT identifier;
receiving, from the blockchain, non-fungible token data associated with the NFT identifier including ownership data that includes a wallet identifier; and
verifying that the wallet identifier in the ownership data matches a user device wallet identifier.

14. The non-transitory, computer-readable medium of claim 13, the instructions, when executed, are to cause the processing units to detect the association by:
detecting a newly-minted token in the non-fungible token collection, the newly-minted token having a set of attributes that includes the combination of the two or more of the non-fungible token attributes; and
detecting a correlation between the combination of the two or more of the non-fungible token attributes and the one or more product records.

15. The non-transitory, computer-readable medium of claim 14, wherein the one or more product records include product attributes, and wherein the correlation is based on matching between the product attributes and the combination of two or more of the non-fungible token attributes.

16. The non-transitory, computer-readable medium of claim 15, wherein the correlation has an associated correlation metric, and wherein the instructions, when executed, are to cause the processing units to automatically generate the access rule based on determining that the correlation metric exceeds a minimum confidence threshold.

17. The computing system of claim 9, wherein the instructions, when executed, are to cause the processing units to verify that the wallet identifier in the ownership data matches the user device identifier by validating a cryptographic signature from the user device using the wallet identifier.

18. The computing system of claim 9, wherein the non-fungible token data further includes the combination of two or more of the non-fungible token attributes.

19. The non-transitory, computer-readable medium of claim 13, wherein the instructions, when executed, are to cause the processing units to verify that the wallet identifier in the ownership data matches the user device identifier by validating a cryptographic signature from the user device using the wallet identifier.

20. The non-transitory, computer-readable medium of claim 13, wherein the non-fungible token data further includes the combination of two or more of the non-fungible token attributes.

* * * * *